US011754481B2

(12) United States Patent
Fahem et al.

(10) Patent No.: US 11,754,481 B2
(45) Date of Patent: Sep. 12, 2023

(54) METHOD FOR DETERMINING MIXED MODE DYNAMIC FRACTURE TOUGHNESS OF ENGINEERING MATERIALS INVOLVING FORMING SURFACE CRACKS IN SPECIMENS

(71) Applicant: UNIVERSITY OF SOUTH CAROLINA, Columbia, SC (US)

(72) Inventors: Ali F. Fahem, Columbia, SC (US); Addis Kidane, Columbia, SC (US); Michael A. Sutton, Columbia, SC (US)

(73) Assignee: University of South Carolina, Columbia, SC (US)

( * ) Notice: Subject to any disclaimer, the term of this patent is extended or adjusted under 35 U.S.C. 154(b) by 528 days.

(21) Appl. No.: 16/899,023

(22) Filed: Jun. 11, 2020

(65) Prior Publication Data
US 2020/0408657 A1 Dec. 31, 2020

Related U.S. Application Data

(60) Provisional application No. 63/010,879, filed on Apr. 16, 2020, provisional application No. 62/868,015, filed on Jun. 28, 2019.

(51) Int. Cl.
*G01N 3/22* (2006.01)

(52) U.S. Cl.
CPC ......... *G01N 3/22* (2013.01); *G01N 2203/027* (2013.01)

(58) Field of Classification Search
CPC ............ G01N 3/313; G01N 3/30; G01N 3/00; G01N 1/36; G01N 3/20; G01N 3/02;
(Continued)

(56) References Cited

U.S. PATENT DOCUMENTS

| | | | |
|---|---|---|---|
| 6,588,283 B2 | 7/2003 | Wang et al. | |
| 7,204,153 B2 * | 4/2007 | Phipps | G01N 3/04 73/845 |
| 8,825,423 B1 * | 9/2014 | Brovold | G01N 3/08 702/41 |

OTHER PUBLICATIONS

Abaqus Fea. "SIMULIA™: Abaqus Unified FEA—Simulate Realistic Performance with Advanced Multiphysics Solutions" *Dassault Systèmes Corp.* (2017) pp. 1-6.
(Continued)

*Primary Examiner* — Brandi N Hopkins
(74) *Attorney, Agent, or Firm* — Dority & Manning, P.A.

(57) ABSTRACT

A hybrid experimental-numerical approach is disclosed to determine the Mixed Mode (I/III) dynamic fracture initiation toughness of engineering materials. Cylindrical Aluminum alloy specimens with a V-notch spiral crack on the surface at spiral angles of 0°, 11.25°, 22.5°, 33.75°, and 45° are subjected to dynamic torsion load using torsional Hopkinson bar apparatus. The torque applied to the specimen at the onset of fracture is measured through strain gages attached to the incident and transmitter bars. A stereo digital image correlation is performed to measure the full-field deformation, and the crack mouth opening displacement as a function of loading time and is used to estimate the time at which the crack initiation is started. The dynamic stress intensity factors are extracted numerically based on the dynamic interaction integral method using Abaqus. The Mode-I ($K_{Id}$), Mode-III ($K_{IIId}$), and Mixed Mode ($K_{(I/III)d}$) dynamic initiation toughness is presented as a function of spiral angles and loading rate.

35 Claims, 15 Drawing Sheets

(58) Field of Classification Search
CPC ...... G01N 33/24; G01N 3/44; G01N 21/8851; G01N 3/22; G01N 3/08; G01N 3/068; G01N 3/066; G01N 3/307; G01N 29/14; G01N 2203/027; C03C 23/0025; G01L 1/24; G09B 23/30
See application file for complete search history.

(56) References Cited

OTHER PUBLICATIONS

Barnett, et al. "The Fracture Mechanics of Slit-like Cracks in Anisotropic Elastic Media" *J. Mech. Phys. Sol.* 20 (1972) pp. 353-366.
Chao, et al. "Relationship Between Crack-Tip Constraint and Dynamic Fracture Initiation Toughness" *J. Press. Vessel Techn.* 132:021404 (2010) pp. 1-9.
Chao, et al. "On the Failure of Cracks Under Mixed Mode Loads" *Int'l J. Fract.* 87 (1997) pp. 201-223.
Chen, et al. "Split Hopkinson (Kolsky) Bar: Design, Testing and Application" *Springer* (2011) pp. 11-80.
Chong, et al. "New Specimens for Mixed Mode Fracture Investigations of Geomaterials" *Eng. Fract. Mech.* 30 (1988) pp. 701-712.
Deng, X. "The Asymptotic Stmcture of Transient Elastodynamic Fields at the Tip of a Stationary Crack" *Proc. Roy. Soc. Lond. A* 446 (1994) pp. 1-13.
Dodds, et al. "Numerical Evaluation of Domain and Contour Integrals for Nonlinear Fracture Mechanics: Formulation and Implementation Aspects" *U. of Illinois* UILU-ENG-88-2006 (1988) pp. 1-52.
Duffy, et al. "A Method for Dynamic Fracture Initiation Testing of Ceramics" *J. Eng. Mater. Techn.* 110 (1987) pp. 325-331.
Fahem, et al. "Mixed Mode (Mode I/III) Dynamic Fracture Initiation Toughness of Aluminum Alloy" *Challenges in Mechanics of Time Dependent Materials: Fracture, Fatigue, Failure and Damage Evolution* vol. 2 Springer (2020) pp. 59-64.
Fahem, et al. "Mode-I Dynamic Fracture Initiation Toughness Using Torsion Load" *Eng. Fract. Mech.* 213 (2019) pp. 53-71.
Fahem, et al. "Geometry Factors for Mode I Stress Intensity Factor of a Cylindrical Specimen with Spiral Crack Subjected to Torsion" *Eng. Fract. Mech.* 214 (2019) pp. 79-94.
Fahem, et al. "Ch. 10—Modification of Benthem Solution for Mode I Fracture of Cylinder with Spiral Crack Subjected to Torsion" *Fracture, Fatigue, Failure and Damage Evolution* vol. 6 Springer (2019) pp. 57-63.
Fahem, et al. "Ch. 15—A Progression on the Determination of Dynamic Fracture Initiation Toughness Using Spiral Crack" *Fracture, Fatigue, Failure and Damage Evolution* vol. 6 Springer (2019) pp. 89-95.
Fahem, A.F. "Using a Nondispersive Wave Propagation for Measuring Dynamic Fracture Initiation Toughness of Materials: Experimental and Numerical Based Study" *U. S. Carolina* (2019) pp. 1-116.
Fahem, et al. "Ch. 24—Hybrid Computational and Experimental Approach to Identify the Dynamic Initiation Fracture Toughness at High Loading Rate" *Dynamic Behavior of Materials* vol. 1 Springer (2018) pp. 141-146.
Fahem, et al. "Ch. 26—A General Approach to Evaluate the Dynamic Fracture Toughness of Materials" *Dynamic Behavior of Materials* vol. 1 Springer (2017) pp. 185-194.
Freund, LB. "Dynamic Fracture Mechanics" *Cambridge University Press* (1990) pp. 1-563.
Gosz, et al. "An interaction energy integral method for computation of mixed-mode stress intensity factors along non-planar crack fronts in three dimensions" *Eng. Fract. Mech.* 69 (2002) pp. 299-319.
Graff, K.F. "Wave Motion Elastic Solids" *Dover* (1975) pp. 1-649.
Jiang, et al. "Hopkinson Bar Loaded Fracture Experimental Technique: A Critical Review of Dynamic Fracture Toughness Tests" *Appl. Mech. Rev.* 62 (2009) pp. 1-39.

Kalthoff, et al. "Instability of Cracks Under Impulse Loads" *J. Appl. Phys.* 48 (1977) pp. 986-993.
Kidane, et al. "Ch. 37—A New Method for Dynamic Fracture Toughness Determination Using Torsion Hopkinson Pressure Bar" *Dynamic Behavior of Materials* vol. 1 Springer (2014) pp. 307-312.
Kidane, et al. "Thermo-Mechanical Stress Fields and Strain Energy Associated with a Mixed-Mode Propagating Crack" *Acta Mech.* 215 (2010) pp. 57-69.
Kidane, et al. "Mixed-Mode Dynamic Crack Propagation in Graded Materials Under Thermo-Mechanical Loading" *Eng. Fract. Mech.* 77 (2010) pp. 2864-2880.
Klepaczko, J.R. "Ch. 4—Dynamic Crack Initiation, Some Experimental Methods and Modelling" *Crack Dynamics in Metallic Materials* Springer-Verlag (1990) pp. 255-453.
Kuna, M. "Finite Elements in Fracture Mechanics: Theory-Numerics-Applications" *Springer* (2013) pp. 1-447.
Liu, et al. "Tensile-Shear Transition in Mixed Mode I/III Fracture" *Int'l. J. Solids Struct.* 41 (2004) pp. 6147-6172.
Maigre, et al. "Mixed-Mode Quantification for Dynamic Fracture Initiation: Application to the Compact Compression Specimen" *Int'l J. Solids Struct.* 30 (1993) pp. 3233-3244.
Mallon, et al. "On the Effect of Microstructure on the Torsional Response of AA7050-T7651 at Elevated Strain Rates" *Mater. Sci. Eng. A* 639 (2015) pp. 280-287.
Nadai, A. "Theory of Flow and Fracture of Solids" *McGraw-Hill* (1950) pp. 1-572.
Naik, et al. "Interlaminar Shear Properties of Polymer Matrix Composites: Strain rate effect" *Mech. Mater.* 39 (2007) pp. 1043-1052.
Nakamura, et al. "Analysis of a Dynamically Loaded Three-Point-Bend Ductile Fracture Specimen" *Eng. Fract. Mech.* 25 (1986) pp. 323-339.
Nakamura, et al. "Elastic-Plastic Analysis of a Dynamically Loaded Circumferentially Notched Round Bar" *Eng. Fract. Mech.* 22 (1985) pp. 437-452.
Nishioka, et al. "Path-Independent Integrals, Energy Release Rates, and General Solutions of Near-Tip Fields in Mixed-Mode Dynamic Fracture Mechanics" *Eng. Fract. Mech.* 18 (1983) pp. 1-22.
Owen, et al. "Experimental Determination of Dynamic Crack Initiation and Propagation Fracture Toughness in Thin Aluminum Sheets" *Int'l J. Fract.* 90 (1998) pp. 153-174.
Petrov, et al. "On the Modeling of Fracture of Brittle Solids" *J. Appl. Mech.* 61 (1994) pp. 710-712.
Peyman, et al. "Computation of Dynamic Stress Intensity Factors for Cracks in Three-Dimensional Functionally Graded Solids" *Proc. Inst. Mech. Eng. Pt. L J. Mater. Des. Appl.* 0 (2017) pp. 1-12.
Prasad, et al. "Influence of Mixed Mode I/III Loading on Dynamic Fracture Toughness of Mild Steel at Room and Low Temperatures" *Mater. Sci. Eng. A* 590 (2014) pp. 54-59.
Ravi-Chandar, K. "Dynamic Fracture" *Elsevier Ltd.* (2004) pp. 1-254.
Ravi-Chandar, K. "On the Failure Mode Transitions in Polycarbonate Under Dynamic Mixed-Mode Loading" *Int'l J. Solids Struct.* 32 (1995) pp. 925-938.
Rice, J.R. "A Path Independent Integral and the Approximate Analysis of Strain Concentration by Notches and Cracks" *J. Appl. Mech.* 35 (1968) pp. 379-386.
Shih, et al. "Elastic-Plastic Analysis of Cracks on Bimaterial Interfaces: Part I—Small Scale Yielding" *J. Appl. Mech.* 55 (1988) pp. 299-316.
Sih, G.C. "Strain-Energy-Density Factor Applied to Mixed Mode Crack Problems" *Int'l J. Fract.* 10 (1974) pp. 305-320.
Sih, et al. "Wave Propagation in an Elastic Solid with a Line of Discontinuity of Finite Crack" *Qtrly. Appl. Math.* 27 (1969) pp. 193-213.
Sih, G.C. "Some Elastodynamic Problems of Cracks" *Int'l J. Fract. Mech.* 4 (1968) pp. 51-68.
Sundaram, et al. "Dynamic mixed-mode fracture behaviors of PMMA and polycarbonate" *Eng. Fract. Mech.* 176 (2017) pp. 186-212.
Sutton, et al. "Image Correlation for Shape, Motion and Deformation Measurements—Basic Concepts, Theory and Applications" *Springer* (2009) pp. 1-321.

(56) References Cited

OTHER PUBLICATIONS

Sutton, et al. "The Effect of Out-of-plane Motion on 2D and 3D Digital Image Correlation Measurements" *Opt. Lasers Eng.* 46 (2008) pp. 746-757.

Sutton, M.A. "Three-dimensional digital image correlation to quantify deformation and crack-opening displacement in ductile aluminum under mixed-mode I/III loading" *Opt. Eng.* 46:051003 (2007) pp. 1-17.

Sweeney, J. "Analysis of a Proposed Method for Toughness Measurements Using Torsion Testing" *Strain Anal. Eng. Des.* 20 (1985) pp. 1-5.

Truss, et al. "The Fracture Toughness of Polyethylenes by a Novel High Pressure Technique" *J. Mater. Sci.* 19 (1984) pp. 413-422.

Vargas, et al. "Three-Dimensional, Inelastic Response of Single-Edge Notch Bend Specimens Subjected to Impact Loading" *Naval Surf. Warfare Ctr.* CARDIVNSWC-TR-61-CR-93/02 (1993) pp. 1-191.

Walters, et al. "Computation of Mixed-Mode Stress Intensity Factors for Cracks in Three-Dimensional Functionally Graded Solids" *J. Eng. Mech.* 132 (2006) pp. 1-15.

Wang, et al. "Using torsional bar testing to determine fracture toughness" *Fatigue Fract. Eng. Mater. Struct.* 23 (2000) pp. 917-927.

Williams, M.L. "On the Stress Distribution at the Base of a Stationary Crack" *J. Appl. Mech.* 24 (1957) pp. 109-114.

Yau, et al. "A Mixed Mode Crack Analysis of Isotropic Solids Using Conservation Laws of Elasticity" *J. Appl. Mech.* 47 (1980) pp. 335-341.

Yu, et al. "An interaction integral method for 3D curved cracks in nonhomogeneous materials with complex interfaces" *Int'l J. Solids Struct.* 47 (2010) pp. 2178-2199.

\* cited by examiner

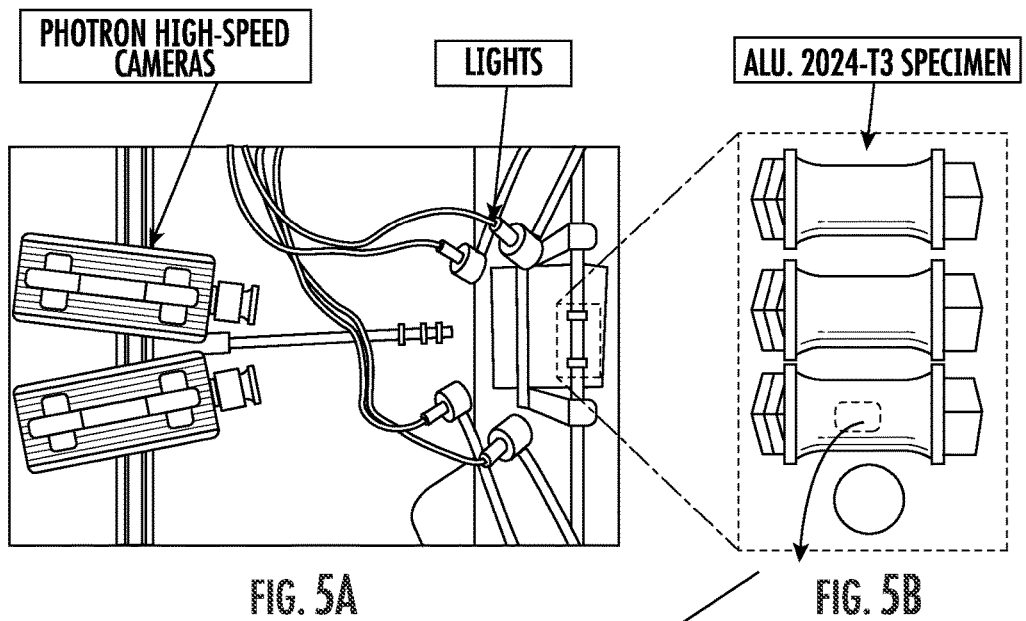
FIG. 5A
FIG. 5B
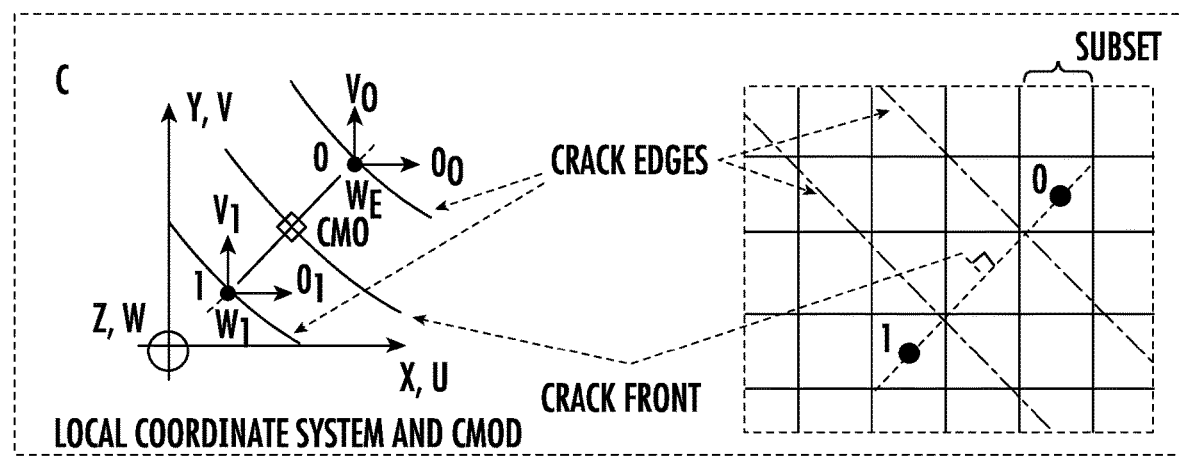
FIG. 5C

US 11,754,481 B2

METHOD FOR DETERMINING MIXED MODE DYNAMIC FRACTURE TOUGHNESS OF ENGINEERING MATERIALS INVOLVING FORMING SURFACE CRACKS IN SPECIMENS

CROSS REFERENCE TO RELATED APPLICATIONS

This application claims filing benefit of U.S. Provisional Patent Application Ser. No. 62/868,015, having a filing date of Jun. 28, 2019, and claims filing benefit of U.S. Provisional Patent Application Ser. No. 63/010,879 having a filing date of Apr. 16, 2020, both of which are entitled "METHOD TO DETERMINE MIXED-MODE (I/III) DYNAMIC FRACTURE TOUGHNESS," and both of which are fully incorporated herein by reference, and for all purposes.

BACKGROUND OF THE PRESENTLY DISCLOSED SUBJECT MATTER

Dynamic fracture has been a topic of interest in the mechanics and material science communities in the last four decades (Freund 1990; Ravi-Chandar 2004). Generally speaking, fracture mechanics is an available tool for addressing the task of improving the performance of mechanical components. In such a context, fracture events are classified as having specific determined Mode characteristics. In particular, Mode-I relates to opening mode (tensile stress normal to the plane of the crack). Mode-II is called sliding mode (a shear stress acting parallel to the plane of the crack and perpendicular to the crack front; in-plane shear). Mode-III relates to a tearing mode (a shear stress acting parallel to the plane of the crack and parallel to the crack front; out-of-plane shear).

Mixed Mode fracture (Mode I and Mode III) are seen in thin-walled structures and structures that are subjected to axial/torsion loading, such as pipes, aircraft wings, shafts, and rotor blades, as well as to biomedical applications. Understanding the dynamic fracture properties of materials under the Mixed Mode condition is essential for the integrity and safety of structures. Though there is a lot of progress in the general understanding of fracture (Owen et al. 1998), limited data is available in Mixed Mode dynamic fracture of materials. There are few experimental methods available to measure the dynamic fracture properties of materials under Mode-I or Mode-II conditions (Jiang and Vecchio 2009). However, there is no standard experimental method to measure the dynamic Mixed Mode fracture properties of materials, especially for the Mode I/Mode III condition (Fahem 2019b).

Some of the early work on a static and dynamic Mixed Mode fracture are summarized below. In 1974, Sih developed a theoretical solution of the Mixed Mode fracture criterion for materials under quasi-static conditions based on minimum strain energy density values around the crack tip. Sih showed, under Mixed Mode condition (Mode I/II), the crack propagates in the direction in a plane normal to the crack edge (Sih 1974). Yau et al., in 1980, used elastic conservation laws and fundamental theory of fracture mechanics to analyze a Mixed Mode fracture (I/II) in a two-dimension plane (Yau et al. 1980). A semicircle specimen with edge crack subjected to a concentrated load at a differing angle was used to investigate the Mixed Mode (I/II) fracture (Chong and Kuruppu 1988). Chao and Liu investigated the Mixed Mode fracture (I/II) of a plate by applying shear and tensile loads. They showed that: 1) the maximum hoop stress criteria are sufficient for Mixed Mode analysis when Mode-I is significant; and 2) the maximum shear stress criterion is appropriate when Mode-II is significant (Chao and Liu 1997; Liu et al. 2004). In 2007, Sutton et al. (Sutton 2007) used stereo digital image correlation method to quantify the crack opening displacement of aluminum specimens subjected to Mixed Mode (I/III) loading using Arctnage specimen subjected to in-plane tension and out-of-plane tearing load.

In a dynamic condition, there have been efforts on investigating the dynamic Mixed Mode fracture properties of a material as follows: Nishioka and Atluri, in 1983, introduced a new, path-independent J-integral solution for elastodynamic crack propagation in generally Mixed Mode condition (Nishioka and Atluri 1983). Chandar, in 1995, investigated polycarbonate materials under Mixed Mode dynamic conditions (Ravi-Chandar 1995). Compact compression specimen with a split Hopkinson presser bar was used by Maigre and Rittel (Maigre and Rittel 1993) to investigate the Mixed Mode dynamic fracture. The dynamically Mixed Mode crack propagation formula of isotropic and graded materials subjected to thermal-mechanical loading was developed by Kidane et al. (Kidane et al. 2010a, b). In 2004, Prasad et al. (Prasad et al. 2014) studied the influence of loading rate on the Mixed Mode fracture toughness of steel. A Hopkinson presser bar with a full-field digital gradient sensing method was used for the dynamic Mixed Mode (I/III) fracture analysis of PMMA and PC materials (Sundaram and Tippur 2017).

Most of the dynamic Mixed Mode fracture work is done using a traditional Hopkinson bar (tension or compression) and standard crack specimens (Jiang and Vecchio 2009). There is inconsistency in the literature on the value of the dynamic fracture toughness of materials compared with the quasi-static fracture toughness values. The sophisticated nature of the experiments and the variables involved could be one of the reasons for the observed inconsistency (Sih 1968; Kalthoff and Shockey 1977; Petrov and Morozov 1994).

Conceptually, the dynamic fracture toughness parameter is divided into three main parameters related to the crack events: *Dynamic initiation fracture toughness, Dynamic propagation fracture toughness*, and *Dynamic arrest fracture toughness* (Ravi-Chandar 2004). Furthermore, at the stationary condition, the dynamic fracture initiation toughness treats depended on three main criteria, as shown in Tabel (1), and the extensive details of these criteria are available in (Sih 1968; Kalthoff and Shockey 1977; Petrov and Morozov 1994).

TABLE 1

Dynamic Initiation Fracture Toughness Criterion

| Criterion | Definition |
| --- | --- |
| Maximum Stress Intensity | The value of the dynamic stress intensity factor is higher than the static values, and even the dynamic load amplitude is less than the static load. |
| Minimum Time criteria | The dynamic stress intensity factor should be more than the critical values for a few microseconds before the crack initiation. |
| Incubation Time criterion | The minimum time required to characterize the material response in quantum scale. |

SUMMARY OF THE PRESENTLY DISCLOSED SUBJECT MATTER

Aspects and advantages of the presently disclosed subject matter will be outlined in part in the following description, or may be apparent from the description, or may be learned through practice of the presently disclosed subject matter.

Broadly speaking, the presently disclosed subject matter relates to a unique method to measure the fracture toughness of material with a different loading rate without inertia effect.

Another presently disclosed broader objective is to provide a novel approach to determine Mode-I, Mode-III, and Mixed Mode (I/III) dynamic fracture initiation toughness of engineering materials. Cylindrical Aluminum alloy specimens with a V-notch spiral crack on the surface at spiral angles are subjected to dynamic torsion load using the torsional Hopkinson bar apparatus. A 3D digital image correlation is performed to measure the full-field displacement around the crack edges and used to estimate the time at which the crack initiation is started. The dynamic stress intensity factors are extracted numerically based on the dynamic interaction integral method using Abaqus.

One presently disclosed exemplary embodiment relates to a method that uses one configuration specimen to measure a different type of dynamic fracture mode. The accuracy of the result is higher than the classical methods since the new method uses a unique load direction application.

Still further, in particular, for some embodiments disclosed herewith, a hybrid experimental-numerical approach is disclosed to determine the Mixed Mode (I/III) dynamic fracture initiation toughness of engineering materials. Cylindrical Aluminum alloy specimens with a V-notch spiral crack on the surface at spiral angles of 0°, 11.25°, 22.5°, 33.75°, and 45° are subjected to dynamic torsion load using torsional Hopkinson bar apparatus. The torque applied to the specimen at the onset of fracture is measured through strain gages attached to the incident and transmitter bars. A stereo digital image correlation is performed to measure the full-field deformation, and the crack mouth opening displacement as a function of loading time and used to estimate the time at which the crack initiation is started. The dynamic stress intensity factors are extracted numerically based on the dynamic interaction integral method using Abaqus. The Mode-I ($K_{Id}$), Mode-III ($K_{IIId}$), and Mixed-mode ($K_{(I/III)d}$) dynamic initiation toughness is presented as a function of spiral angles and loading rate.

For some presently disclosed subject matter, the dynamic fracture initiation toughness of Al. 2024-T3 under Mode-I, Mode-III, and Mixed-mode (I/III) are measured experimentally and numerically. The experimental method and numerical method may both be used, as discussed herein, with reference to exemplary results.

One exemplary embodiment of presently disclosed subject matter relates in pertinent part to a method for determining Mixed Mode dynamic fracture toughness of engineering materials. Such method preferably comprises providing a least two specimens of the subject engineering materials to be rated; forming a surface crack in each of the specimens at a respective selected angle representative of different fracture Modes; respectively subjecting the specimens to dynamic torsion load; respectively measuring torque applied to each of the specimens at the onset of fracture therein; respectively measuring the full-field deformation and the crack mouth opening displacement of each such fracture as a function of loading time; respectively estimating the time at which each crack initiation is started; and respectively determining dynamic stress intensity factors for the specimens, based on such measurements and determinations.

Another exemplary embodiment of presently disclosed subject matter relates in pertinent part to a methodology for determining dynamic Mixed-mode (I/III) of materials by investigating a plurality of spiral crack specimens from pure Mode-III up to pure Mode-I throughout the dynamic Mixed-mode (I/III) of fracture under pure impulse torsional load. Such methodology preferably comprises using a torsional Hopkinson Bar to generate a torsional impulse load for each specimen; using one-dimension wave propagation theory to measure a far-field maximum fracture load for each specimen; determining under pure torsional load dynamic stress intensity factors of plural specimen spiral cracks with different crack angles; and using dynamic interaction integral numerical calculation to identify dynamic fracture initiation properties $K_{Id}$, $K_{IIId}$, and $K_{Md}$, of Mode-I, Mode-III, and Mixed-mode (I/III), respectively.

Yet another exemplary embodiment of presently disclosed subject matter relates in pertinent part to methodology to estimate dynamic fracture properties for Mode I, Mode III, and Mixed-mode I/III fracture conditions for engineering materials subjected to critical load with a different loading rate without inertia effect. Such methodology preferably comprises applying loading to a plurality of specimens of engineering materials sufficient to induce fracture therein in plural Modes of fracture conditions; measuring initiation time $t_f$ of a fracture event; measuring incident torque during a fracture event; inputting measured incident torque to a finite element model; calculating the interaction integral of a unit virtual advance of a finite crack front segment for a specific mode at a particular point as a function of time; and using the components of dynamic interaction integral to calculate the dynamic stress intensity factor for each mode.

Additional objects and advantages of the presently disclosed subject matter are set forth in or will be apparent to those of ordinary skill in the art from the detailed description herein. Also, it should be further appreciated that modifications and variations to the specifically illustrated, referred and discussed features, elements, and steps hereof may be practiced in various embodiments, uses, and practices of the presently disclosed subject matter without departing from the spirit and scope of the subject matter. Variations may include, but are not limited to, the substitution of equivalent means, features, or steps for those illustrated, referenced or discussed, and the functional, operational, or positional reversal of various parts, features, steps, or the like.

Still further, it is to be understood that different embodiments, as well as different presently preferred embodiments, of the presently disclosed subject matter might include various combinations or configurations of presently disclosed features, steps, or elements, or their equivalents (including combinations of features, parts, or steps or configurations thereof not expressly shown in the Figures or stated in the detailed description of such Figures). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification, and will appreciate that the presently disclosed subject matter applies equally to corresponding methodologies as associated with the practice of any of the present exemplary devices, and vice versa.

BRIEF DESCRIPTION OF THE FIGURES

A full and enabling disclosure of the presently disclosed subject matter, including the best mode thereof, directed to one of ordinary skill in the art, is set forth in the specification, which makes reference to the appended Figures, in which:

FIG. 5A illustrates an exemplary representative Stereo Digital Image Correlation Setup;

FIG. 5B illustrates an exemplary typical speckle pattern;

FIG. 5C illustrates a local coordinate system and Crack Mouth Opening Displacement (CMOD) for an exemplary specimen of FIG. 5B;

FIGS. 1A through 6C illustrate respective typical wave signal graphs for respective crack angle examples of: (A) $\beta_{sp}=0°$, (B) $\beta_{sp}=11.25°$, and (C) $\beta_{sp}=45°$;

FIG. 6D represents the numerical result of a stress contour distribution around a crack tip;

FIG. 6E graphically illustrates normalized stress (von Mises stress/Far-Field Stress) versus normalized distance from a crack tip along the crack ligament;

Figure 1:
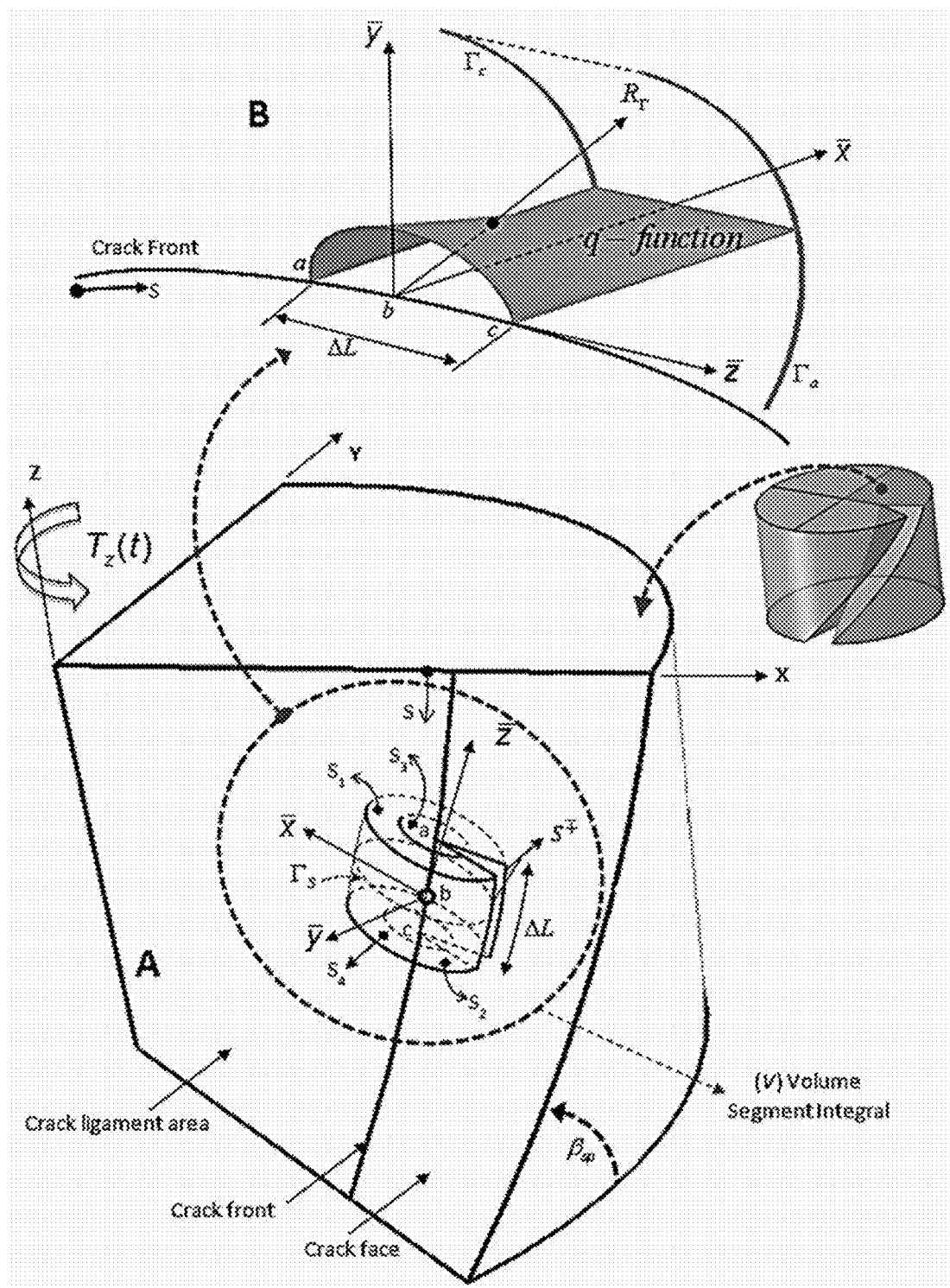
FIG. 1 is a three-dimensional schematic of a partition of a spiral crack, pointwise volume integral domain, and q-Function (per Fahem et al. 2019b)

Repeat use of reference characters in the present specification and drawings is intended to represent the same or analogous features or elements or steps of the presently disclosed subject matter.

DETAILED DESCRIPTION OF THE PRESENTLY DISCLOSED SUBJECT MATTER

It is to be understood by one of ordinary skill in the art that the present disclosure is a description of exemplary embodiments only, and is not intended as limiting the broader aspects of the disclosed subject matter. Each example is provided by way of explanation of the presently disclosed subject matter, not limitation of the presently disclosed subject matter. In fact, it will be apparent to those skilled in the art that various modifications and variations can be made in the presently disclosed subject matter without departing from the scope or spirit of the presently disclosed subject matter. For instance, features illustrated or described as part of one embodiment can be used with another embodiment to yield a still further embodiment. Thus, it is intended that the presently disclosed subject matter covers such modifications and variations as come within the scope of the appended claims and their equivalents.

The present disclosure is generally directed to measuring the fracture toughness of material with a different loading rate and different fracture mode without inertia effect.

1. THEORETICAL FORMULATION 1.1 Elastodynamic Analysis of Stationary Dynamic Crack For a stationary crack in an isotropic linear elastic material, the William's quasi-static stress profile around the crack tip is held under dynamic loading conditions. As the dynamic initiation fracture toughness is the goal of this work, it is essential to demonstrate that the dynamic stress around the crack tip has a similar form of a static case (i.e., the first four terms in William's series expansion solution can be used for the static and dynamic problem as well) (Williams 1957b; Sih and Loeber 1969; Deng 1994; Chao et al. 2010). In general, when all three modes exist, the linear elastodynamic asymptotic crack stress field solution of material close to the crack tip can be written as Eq. (1) (Freund 1990; Ravi-Chandar 2004). When the crack tip velocity is equal to zero, v=0 (m/s), then Eq. (1), can represent the stress field for a stationary crack under dynamic loading.

$$\sigma_{ij}(r, \theta, t) = \frac{1}{\sqrt{2\pi r}} [K_I(t)f_{ij}^I(\theta, v) + K_{II}(t)f_{ij}^{II}(\theta, v) + K_{III}(t)f_{ij}^{III}(\theta, v)] + \quad (1)$$

$$higher order terms$$

where:
$\sigma_{ij}$ Dynamic stress tensor (Cauchy stress)
r, θ, t Polar coordinate system located at the crack tip and time of loading $f_{ij}^{I,II,III}$ Dimensionless function of θ, and crack tip velocity v, full details in (Freund 1990; Ravi-Chandar 2004).

K(t) The dynamic stress intensity factor

I, II, III Refers to different three modes Opening, In-plane shear, and Out-of-plane shear The total dynamic energy release rate criteria $J_T(t)$, Griffith energetic fracture criterion, is used to extract the fracture parameter (Williams 1957a; Freund 1990). For a Mixed Mode dynamic fracture, the dynamic energy release rate can be written, as shown in Eq. (2):

$$J_T(t) = \frac{1-v^2}{E}[A_I(v)K_I^2(t) + A_{II}(v)K_{II}^2(t)] + \frac{1}{2\mu}A_{III}(v)K_{III}^2(t) \quad (2)$$

where $$A_I = \frac{v^2 \alpha_d}{(1-v)c_s^2 D}; A_{II} = \frac{v^2 \alpha_s}{(1-v)c_s^2 D}; A_{III} = \frac{1}{\alpha_s}; \quad (2.1)$$

$$D = 4\alpha_d\alpha_s - (1+\alpha_s^2)^2 \text{ and } \alpha_d = \sqrt{\frac{1-v^2}{c_d^2}};$$

$$\alpha_s = \sqrt{\frac{1-v^2}{c_s^2}},$$

v is crack tip velocity, $c_d$ and $c_s$ are the elastic dilatational wave speed, and elastic shear wave speed of the material, respectively. $\alpha_d$ and $\alpha_s$ are scale factors of dilatational wave and shear wave speed, respectively (Freund 1990).

The properties of Eq. (2.1) do not depend on the load applied or the crack geometry, and as v→0⁺ (m/s) (stationary dynamic crack), all values become a unity, $A_{I,II,III}$→1 (Freund 1990; Ravi-Chandar 2004). As a result, for a stationary crack, the dynamic energy release rate criteria, Eq. (2) can be rewritten, as shown in Eq. (3), $$J(t) = \frac{1-v^2}{E}[K_I^2(t) + K_{II}^2(t)] + \frac{1}{2\mu}K_{III}^2(t) \quad (3)$$

On the other hand, for linear elastic materials and in a plane strain condition, the crack tip area is autonomous, the crack tip is completely surrounded by a very small plastic area compared to other dimensions (small-scale-yielding (SSY) condition) (Rice 1968; Freund 1990). Thus, the J-integral can be related to the total stress intensity factor $K_m$ through the properties of the material as shown in Eq. (4), $$J(t) = \frac{K_m^2(t)}{\frac{E}{(1-v^2)}} \Rightarrow \frac{EJ_T(t)}{1-v^2} = K_m^2(t) \quad (4)$$

Thus, the total dynamic energy release rate is representing the contribution of all modes, $K_m = f(K_I, K_{II}, K_{III})$. Substituting equation Eq. (4) into Eq. (3), the relation between the total Mixed-mode stress intensity factor $K_m$, with the individual modes can be written as shown in Eq. (5):

$$K_m^2(t) = K_I^2(t) + K_{II}^2(t) + \frac{K_{III}^2(t)}{1-v} \quad (5)$$

where μ, E, and v are the shear modulus, modulus of elasticity, and Poisson's ratio of the material, respectively.

The dynamic interaction integral method was used to calculate the individual J-integral related to the stress intensity factor, as briefly discussed in the following section.

1.2 Dynamic Interaction Integral Method

The J-integral is a scalar quantity and it does not have any direction related to the fracture mode. The interaction integral method is a technique used to extract the amount of J-integral that relates to each mode of fracture separately. For a general dynamic condition, the J-integral formula for non-growing crack is extended by adding the kinetic energy density (T) to the strain energy density (W) of the material, as shown in Eq. (6) (Nakamura et al. 1985, 1986).

$$J = \lim_{\Gamma \to 0} \int_\Gamma \left((W+T)n_1 - \sigma_{ij}n_j\frac{\partial u_i}{\partial x_1}\right)d\Gamma \quad (6)$$

where $$W = \int_0^{\varepsilon_{ij}} \sigma_{ij}d\varepsilon_{ij} \quad (6.1)$$

$$T = \frac{1}{2}\rho\frac{\partial u_i}{\partial t}\frac{\partial u_i}{\partial t} \quad (6.2)$$

In dynamic fracture mechanics, the inertia force terms can be developed by quick crack propagation or by rapidly applying a dynamic load (Freund 1990; Ravi-Chandar 2004). In this work, the crack was analyzed in a stationary condition, i.e., means no crack propagation or inertia load from the crack propagation was considered. Also, the torsional impulse load does not have axial inertia force as the wave propagates from the incident bar to the transmitted bar through the specimen (Duffy et al. 1987; Klepaczko 1990). Thus, Eq. (6.2) can be eliminated.

FIG. 1 is a three-dimensional schematic of a partition of a spiral crack, pointwise volume integral domain, and q-function (per Fahem et al. 2019b). Thus, for a 3-D curve (like spiral crack), the divergence theorem was applied to Eq. (6) to convert it from the line integral to area and volume integral, as shown in FIG. 1. A schematic of the segment of the volume integral domain at a specific point on the crack front is extended from point a to point c through the volume center point b. The general solution of J-integral of the volume segment on a spiral crack front without thermal strain and neglected kinetic energy is calculated as shown in previous studies (Vargas and Robert, H. Dodds 1993; Gosz and Moran 2002; Walters et al. 2006; Yu et al. 2010; Peyman et al. 2017), Eq. (7).

$$\bar{J}_{(S_a-S_c)} = \int_V \left(\sigma_{ij}\frac{\partial u_i}{\partial x_k}\frac{\partial q_k}{\partial x_j} - W\frac{\partial q_k}{\partial x_k}\right)dV \quad (7)$$

The mean value of the J-integral at point b (the middle of the volume segment) can be written as Eq. (8).

$$J(s) = \frac{\int_a^c [\bar{J}(s)q_k(s)]ds}{\int_a^c q_k(s)ds} = \frac{J_{a-c}}{A_q} \quad (8)$$

where:
- J(s): The energy release rate at point (s) corresponding to the weighted function $q_k(s)$
- J̄(s): A dynamic weighted average of J-integral over the volume segment, FIG. 1.
- V: As illustrated in FIG. 1, the volume enclosed by surfaces $S^\pm$, $S_1$, $S_2$, $S_3$, $S_4$
- $S^\pm$, $S_{1,2,3,4}$: The crack face surfaces, an upper surface, an outer surface, an inner surface, and bottom surface respectively, of the volume domain shown in FIG. 1,
- Γ(s): Contour path around (s) point and perpendicular on the spiral crack front that swept along $$\mp \frac{\Delta L}{2}$$

to generate a volume integral domain (V).
- $q_k$: The smooth continuous weight function (unity at the surface close to the crack tip $S_3$ and vanish at the outer surface $S_1$, $S_2$, $S_4$), FIG. 1B
- $u_i$ Displacement
- t Time
- $\sigma_{i,j}$; $\varepsilon_{ij}$: Cauchy stress tensor and strain tensor
- s: Position along the crack front
- ρ The material density, which is constant
- $A_q$: The project area of the q-function $$\bar{J}_{Intre.}^\alpha(b, t) = \frac{\int_a^c [J^\alpha(s) q_t] ds}{\int q_t ds} \quad \text{(no sum on } \alpha = I, II, \text{ and } III) \quad (11)$$

where: $\bar{J}_{Inter.}^\alpha(b,t) = [\bar{J}_{Inter.}^I(b,t), \bar{J}_{Inter.}^{II}(b,t), \bar{J}_{Inter.}^{III}(b,t)]^T$ The $\bar{J}_{Inter.}^\alpha(b,t)$ is the interaction integral of a unit virtual advance of a finite crack front segment for a specific mode at a particular point as a function of time. The discretized form of interaction integral for a three-dimensional domain is used in a finite element solution. As discussed in the next section, the components of dynamic interaction integral will be used to calculate the dynamic stress intensity factor for each mode.

1.3 Extraction of Stress Intensity Factors

In the case of isotropic linear elastic materials and infinitesimal deformation, the actual J-integral $J_{act}$, corresponding to the stress intensity factors, can be written, as shown in Eq. (12) (Barnett and Asaro 1972; Shih and Asaro 1988; Simulia 2017).

$$J_{act} = \frac{1}{8\pi} K^T \cdot B^{-1} \cdot K \quad (12)$$

where:

| | |
|---|---|
| $K = [K_I, K_{II}, K_{III}]^T$: | Stress intensity factor vector components (opening mode (Mode-I), in-plane shear mode (Mode-II), and out of plane shear mode (Mode-III), respectively). |
| $J_{act} = [J_{int}^I \, J_{int}^{II} \, J_{int}^{III}]^T$ | The actual J-integral components related to the three modes of fracture. |
| B = [EnergyFactors]: | A second-order tensor depends on the directions and elastic properties of the material. It called the pre-logarithmic energy factor tensor (Barnett and Asaro 1972), and for isotropic linear elastic materials can be written as, $B_{11} = B_{22} = \frac{E}{8\pi(1-\nu^2)}$, and $B_{33} = \frac{E}{8\pi(1+\nu)}$, and $B_{12} = B_{13} = B_{23} = 0$ |

On the basis of the dynamic J-integral formula, an auxiliary load field was added to the spiral's crack front. The auxiliary loading field was added to the actual field load. Thus, the superposition J-integral around the crack front was calculated. Then, according to the definition, the dynamic interaction integral $J_{Intre}$ can be written as Eq. (9), (Shih and Asaro 1988).

$$J_{Inter.} = J^{Sup} - J^{act} - J^{aux} \quad (9)$$

In general, Eq. (9) can be written in three different modes that depend on the auxiliary loading field as Eq. (10), $$J_{Inter.}^\alpha(t) = \int_V (\sigma_{ij}(t)(u_{i,1}^{aux}(t))^\alpha + (\sigma_{ij}^{aux}(t))^\alpha u_{i,1}(t)) q_{,j} dV - \frac{1}{2} \int_V (\sigma_{ij}(t)(\varepsilon_{ij}^{aux}(t))^\alpha + (\sigma_{ij}^{aux}(t))^\alpha \varepsilon_{ij}(t)) q_{,j} dV \quad (10)$$

Similar to Eqs. (7 and 8), the result of Eq. (10) is justified along a 3-D segment by using a weighted function, q(s) as shown in Eq. (11), The J-integral defined in Eq. (12) is a general relationship that can be used for static and dynamic initiation conditions since it represents the total energy release rate on a crack. The integral interaction method, as introduced by Asaro and Shih [38,40], was used again to separate the J-integral into the corresponding SIFs associated with different fracture modes.

Following a similar procedure, the interaction-integral, Eq. (9), in addition to using an auxiliary stress intensity factor $K_{I,II,III}$, the dynamic interaction integral-dynamic stress intensity factor for each mode can be obtained as Eq. (13), (Fahem et al. 2019a).

$$J_{Inter.}^\alpha(t) = \frac{1}{4\pi} K_\alpha(t) B_{\alpha\beta}^{-1} K_\beta(t) \quad \text{(no sum on } \alpha = I, II, \text{ and } III) \quad (13)$$

Since $K_\alpha$ is auxiliary stress intensity factor, it can be assumed unity. The corresponding stress intensity factor as a function of the interaction integral can be written as Eq. (14).

$$K_I(t) = \frac{E}{2(1-v^2)} \times ave.\left(\sum_{i=1}^{n} J_{Intre.}^{I}(t)\right) \quad (14.1)$$

$$K_{II}(t) = \frac{E}{2(1-v^2)} ave.\left(\sum_{i=1}^{n} J_{Intre.}^{II}(t)\right) \quad (14.2)$$

$$K_{III}(t) = \frac{E}{2(1+v)} ave.\left(\sum_{i=1}^{n} J_{Intre.}^{III}(t)\right) \quad (14.3)$$

Then, the total Mixed-mode dynamic stress intensity factor $K_m(t)$, i.e., $K_{(I/II/III)d}$ can be calculated by substituting Eq. (14) into Eq. (5) as shown in Eq. (15).

$$K_m(t) = \frac{E}{2(1+v)} \frac{1}{n} \sqrt{\left(\sum_{i=1}^{n} J_{Intre.}^{I}(t)\right)^2 + \left(\sum_{i=1}^{n} J_{Intre.}^{II}(t)\right)^2 + \left(\sum_{i=1}^{n} J_{Intre.}^{III}(t)\right)^2} \quad (15)$$

where n, always a positive integer, represents the number of paths around the crack tip, and $J_{Inter.}^{\alpha}$ are evaluated numerically from Eqs. (10 and 11). A finite element model was generated to calculate the stress intensity factor at each point (in the middle of the volume segment) along the spiral's crack front line.

2. EXPERIMENTAL SETUP

2.1 Material and Specimen

Figure 2A:
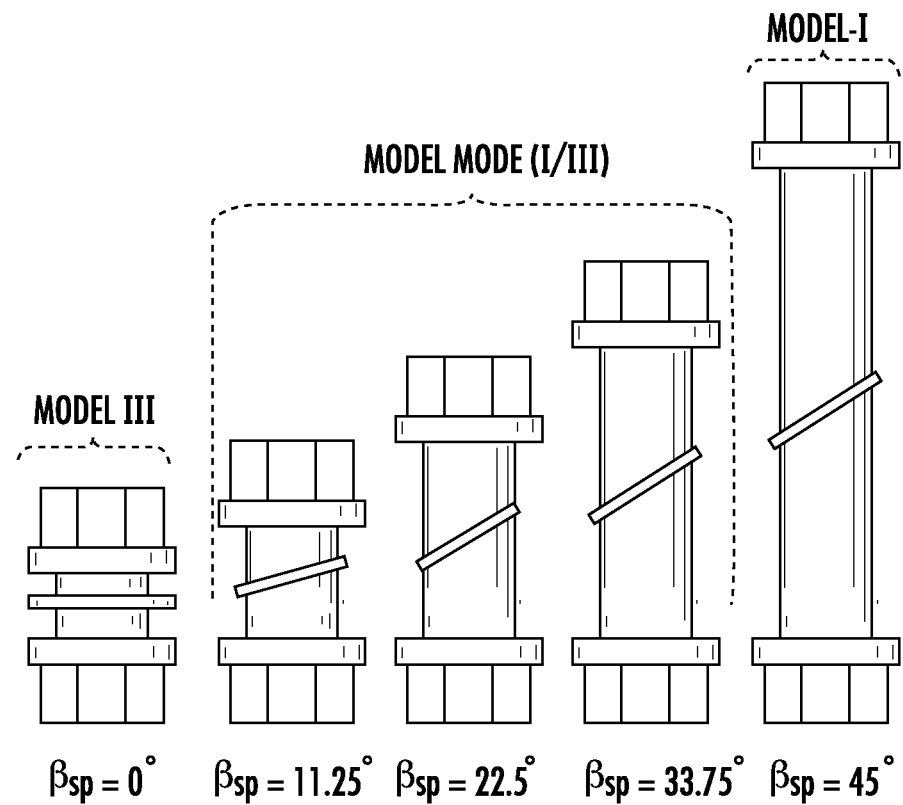
FIG. 2A illustrates specimens of Aluminum 2024-T3 with full spiral v-notches of Mode-III, Mixed-mode (I+III) and Mode-I, respectively.
Figure 3:
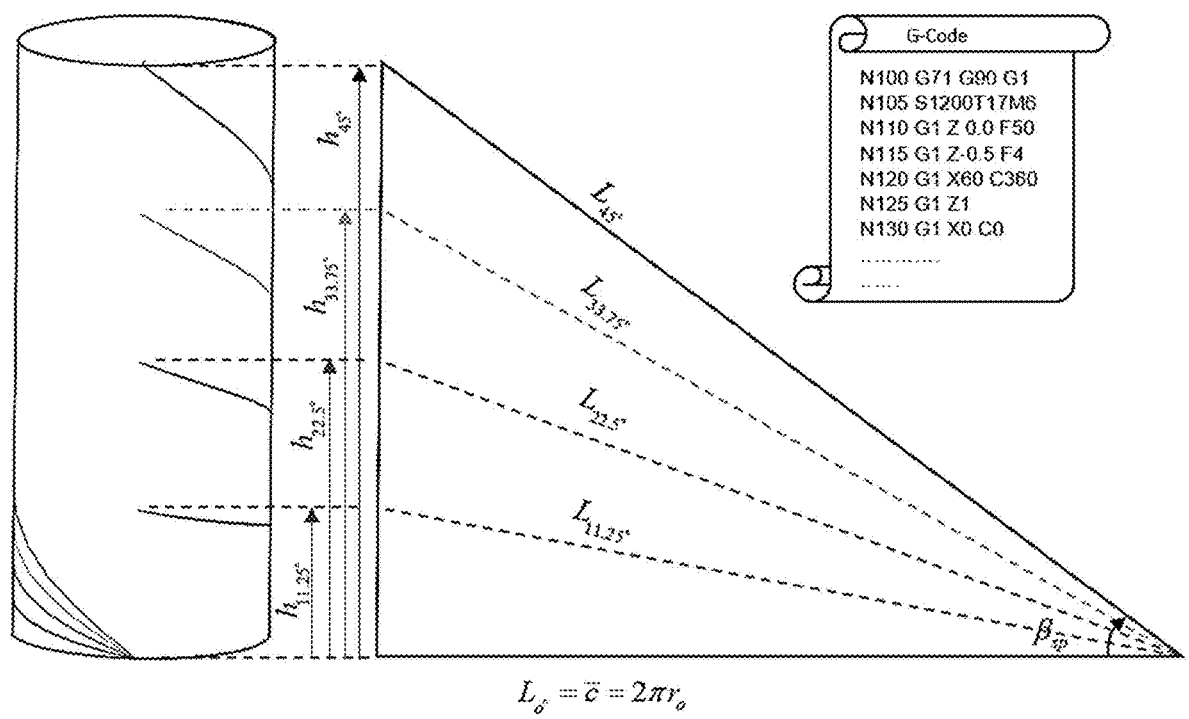
FIG. 3 illustrates a schematic of various examples of the subject exemplary spiral path dimensions, for the subject examples of FIG. 2A.

FIG. 2A illustrates specimens of Aluminum 2024-T3 with full spiral v-notches of Mode-III, Mixed-mode (I+III), and Mode-I, respectively. FIG. 3 shows a schematic of various examples of the subject exemplary spiral path dimensions, for the subject examples of FIG. 2A.

A total of 15 spiral crack specimens, with three specimens for each spiral crack's angle, were prepared from Aluminum 2024-T3. The state of the Mixed Mode is controlled by an inclined spiral angle (spiral pitch). The specimens, as shown in FIG. 2, have an outer diameter of 19 mm, the inner diameter of 12.7 mm, and a crack depth of 2.15 mm. More details of the specimen's dimension are listed in Table 2. The gage length h (spiral pitch) depends on the inclined spiral angles $\beta_{sp}$, and external circumference of the specimen $\bar{c}$, as shown in a schematic FIG. 3 and Eq. (16).

$$h(\text{SpiralPitch}) = \bar{c} \times \tan(\beta_{sp}) \quad (16)$$

Figure 2B:
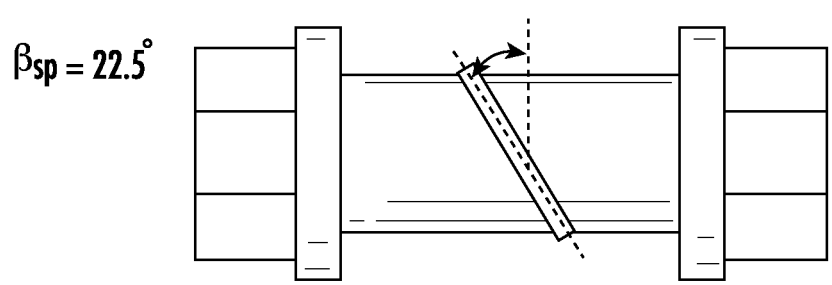
FIG. 2B illustrates one close up an example from FIG. 2A, regarding a cylindrical specimen with spiral v-notch at an angle of 22.5° prepared from Aluminum 2024-T3, and showing overprinted dotted-lines identifying the subject spiral angle.

FIG. 2B illustrates one close up an example from FIG. 2A, regarding cylindrical specimens with spiral v-notch at an angle of 22.5° which were prepared from Aluminum 2024-T3.

Per details as given in Table 2, five different spiral angles were selected: a spiral angle $\beta_{sp}=0°$ for pure Mode-III fracture, $\beta_{sp}=45°$ for pure Mode-I fracture, and the remaining three angles $\beta_{sp}=11.25°$, 22.5° and 33.75° for Mixed-mode fracture. Four-dimension milling machine, Mico-Engraving V-groove cutter tools with 60° V-shape and a tip diameter of 127 μm, and a G-code program were used to manufacture the spiral crack path notch. An external hexagonal socket head was used to connect the specimen to the incident and transmitter Hopkinson bars.

TABLE 2

Spiral Crack Specimens Dimensions

| Out radius $r_0$ (mm) | Spiral angle (Degree) | Spiral Pitch h(mm) | Spiral length L(mm) | Crack Depth c(mm) | Crack Ligament a(mm) | Fracture Mode |
|---|---|---|---|---|---|---|
| 9.5 | 00.00 | 00.00 | 59.66 | 2.15 | 1.00 | III |
| 9.5 | 11.25 | 11.87 | 60.82 | 2.15 | 1.00 | I/III |
| 9.5 | 22.50 | 24.71 | 64.57 | 2.15 | 1.00 | I/III |
| 9.5 | 33.75 | 39.86 | 71.75 | 2.15 | 1.00 | I/III |
| 9.5 | 45.00 | 59.66 | 84.37 | 2.15 | 1.00 | I |

2.2 Torsional Hopkinson Bar Setup

Figure 4:
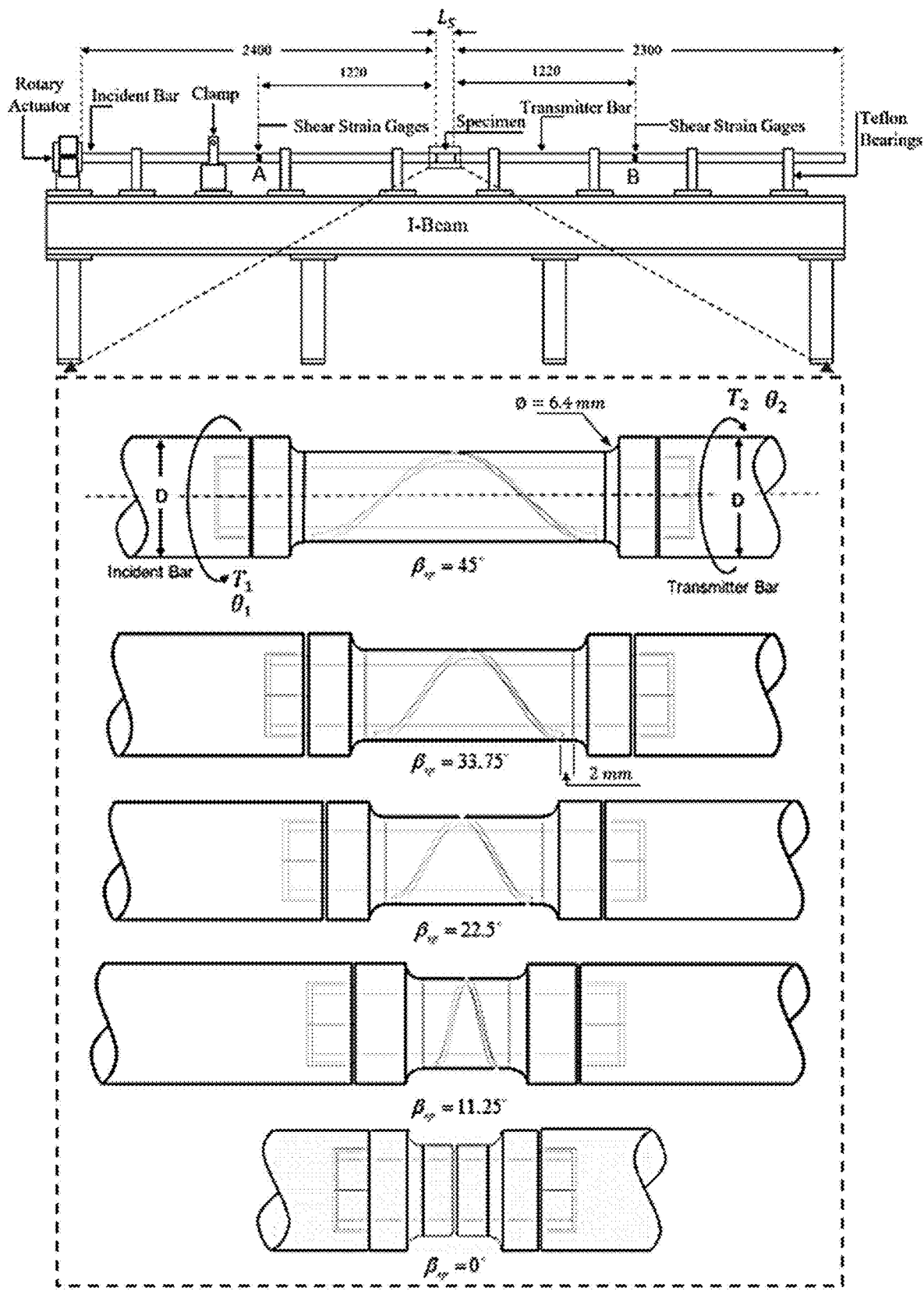
FIG. 4 illustrates a schematic of a Torsional Split Hopkinson Bar (TSHP) and the respective subject Specimens of FIG. 2A (with certain dimensions in mm)

FIG. 4 illustrates a schematic of a Torsional Split Hopkinson Bar (TSHP) and the respective subject specimens of FIG. 2A (with certain dimensions in mm).

The details of the torsional Hopkinson bar apparatus used to loading the specimen are available in the literature (Chen and Bo 2011). For the sake of completeness, the principle is briefly presented below. The THB used in this work has long incident and transmitted bars. The bars are made of 25.4 mm diameter of high-strength Titanium-Grade 5 (ASTM B348). The bars are supported in a horizontal plane and are free to rotate around their central axis. An internal hexagonal groove was manufactured at the ends of the incident and transmitted bar. The spiral notch specimen was sandwiched between the two bars via a hexagonal joint and a thin layer of J-B Weld™ epoxy. The epoxy is used around the hexagonal interface to reduce slip due to a tiny space between the specimen and the bars. The assembly provides a reliable connection that can be used to load the samples even at higher loading rates.

During loading, a hydraulic-driven rotary actuator, shown in FIG. 4, is used to apply and store shear strain in the part of the incident bar between the rotary actuator and the clamp system. Then, the stored shear strain is suddenly released by breaking a brittle notched bolt installed in the clamping mechanism. During this time, half of the stored shear strain propagates towards the specimen through the incident bar. When the incident wave reached the specimen, some of the waves will transmit to the output bar through the specimen, and the rest will reflect back to the incident bar. The incident, transmitted, and reflected shear strain data will be acquired by using pairs of two-element 90-degree Rosette (MMF003193) shear strain gauges attached to the bars at positions A and B as shown in FIG. 4.

The classical torsional theory and one-dimensional wave analysis are used to calculate the incident torque $T_i(t)$, and effective torque applied to the specimen, $T_{eff}(t)$ as shown in Eq. (17) and Eq. (18), respectively.

$$T_i(t) = \frac{GD^3\pi}{16} \times \gamma_I(t) \quad (17)$$

$$T_{eff}(t) = \frac{GD^3\pi}{32} [\gamma_I(t) + \gamma_R(t) + \gamma_T(t)] \quad (18)$$

where G is the shear modulus of the bar; D is the bar diameter and $\gamma_I(t)$, $\gamma_R(t)$, $\gamma_T(t)$ is incident, reflected, and transmitted shear strain, respectively.

2.3 Stereo Digital Image Correlation (3D-DIC)

FIG. 5A illustrates an exemplary representative Stereo Digital Image Correlation setup, while FIG. 5B illustrates an exemplary typical speckle pattern. FIG. 5C illustrates a local coordinate system and Crack Mouth Opening Displacement (CMOD) for an exemplary specimen of FIG. 5B, while FIG.

Figure 5D:
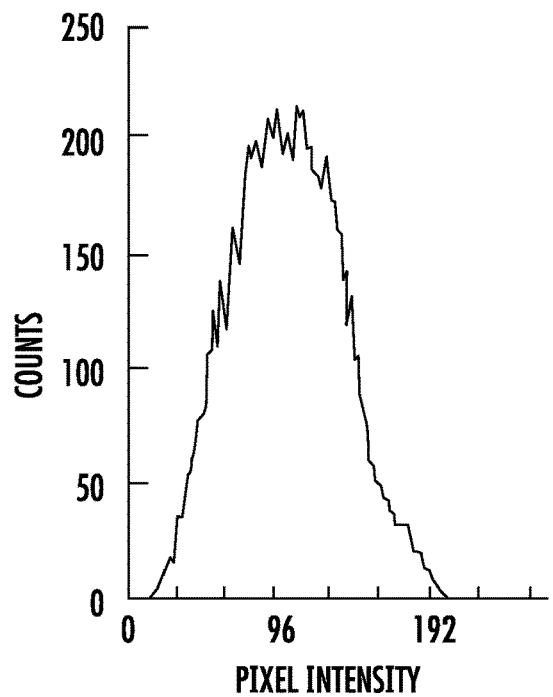
FIG. 5D illustrates a graph of gray-scale intensity.
Figure 5E:
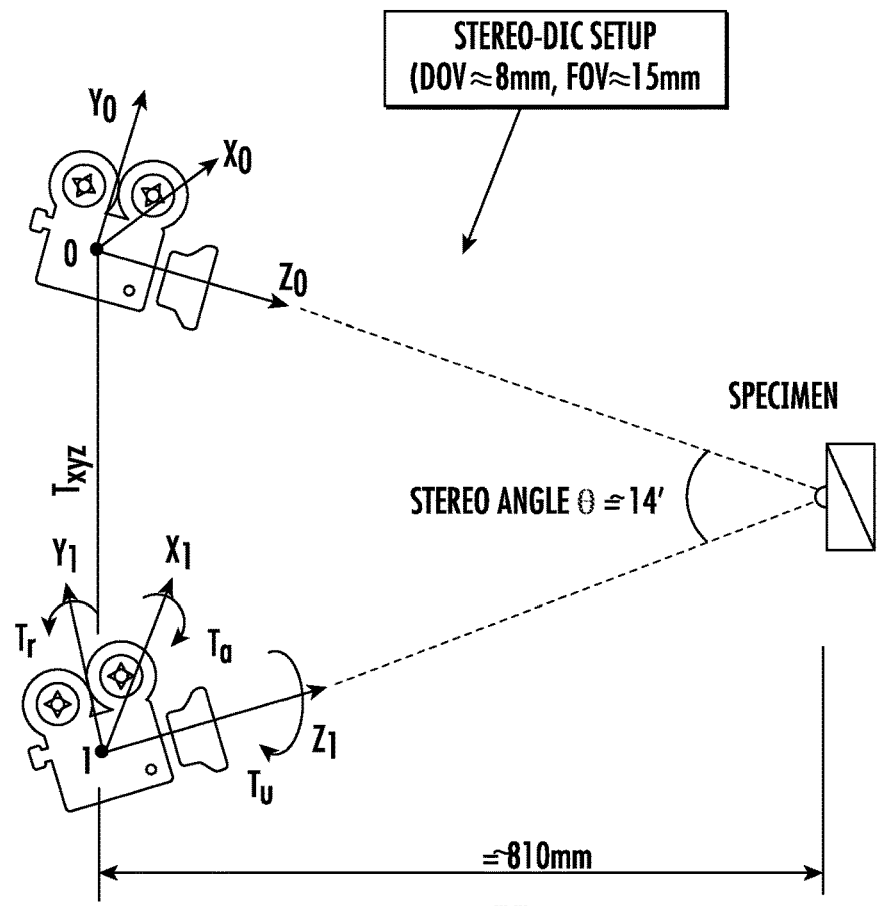
FIG. 5E illustrates a schematic of stereo cameras positions (see also with reference to Table 2)

5D illustrates a graph of gray-scale intensity, and FIG. 5E illustrates a schematic of stereo cameras positions (see also with reference to Table-3).

Full-field measurements of the specimen surface around the edge of the spiral crack were obtained using stereo digital image correlation (3D-DIC) (Sutton et al. 2009). As shown in FIG. 5A, two high-speed cameras, SAX2 by Photon Inc. with Tokina 100 mm lenses, are used to record the surface deformation around the spiral crack edges with 200,000 frames per second at a resolution of 384×296 pixel. Typical speckle pattern around the crack edges with the corresponding gray-scale histograms is shown in FIGS. 5B, 5C, and 5D. Two points, perpendicular to the crack path, across the crack edges, as shown in FIG. 5C, were chosen to estimate the crack edges displacement (CED) and crack mouth opening displacement (CMOD). The displacement components values at the upper edge of the specimen denoted as 0 ($U_0$, $V_0$, $W_0$), and the displacement components values at the lower edge indicated as 1 ($U_1$, $V_1$, $W_1$) were used to measure the crack mouth opening displacement (CMOD), as shown in Eq. (19) (Sutton 2007; Sutton et al. 2008):

$$CMOD(t) = ECD_0(t) - ECD_1(t) \tag{19.1}$$

$$ECD_0(t) = \sqrt{U_0^2(t) + V_0^2(t) + W_0^2(t)} \tag{19.2}$$

$$ECD_1(t) = \sqrt{U_1^2(t) + V_1^2(t) + W_1^2(t)} \tag{19.3}$$

The calibration parameters of the stereo camera system are shown in Table (3) and FIG. 5E. The images are processed using Vic-3D™, commercial digital image correlation software by Correlated Solution, Inc. The parameters for the Stereo DIC are listed in Table (4).

TABLE 3

Calibration system parameters obtained of the stereo cameras setup used

| Parameter | Camera 0 | | Camera 1 | | Relative position ($T_{x,y,z,\alpha,\beta,\gamma}$) | | |
|---|---|---|---|---|---|---|---|
| | Result | SD* | Result | SD* | Parameter | Result | SD* |
| Center (x) Pixels | 490.49 | 03.0802 | 0499.19 | 02.8440 | $T_x =$ | 167.50 (mm) | 0.0128 |
| Center (y) Pixels | 506.86 | 02.2777 | 0516.47 | 02.3675 | $T_y =$ | 01.85 (mm) | 0.0010 |
| Focal Length, x | 5603.4 | 13.9592 | 5628.16 | 14.0910 | $T_z =$ | 14.83 (mm) | 0.3591 |
| Focal Length, y | 5603.9 | 13.9740 | 5628.54 | 14.1423 | $T_\alpha =$ | 00.12 (deg.) | 0.0000 |
| Skew (deg.) | 00.270 | 00.0143 | 00.0180 | 00.0143 | $T_\beta =$ | 12.98 (deg.) | 0.0000 |
| Kappa 1 | 00.120 | 00.0000 | 00.1300 | 00.0000 | $T_\gamma =$ | 00.61 (deg.) | 0.0000 |

SD* is a Standard deviation

TABLE 4

Digital image correlation analysis parameters

| Image Parameters | Values |
|---|---|
| Subset size (Pixels × Pixels) | 25 × 25 |
| Subset spacing (Pixels) | 5 |
| Average Speckle size (Pixel × Pixel) | 5 × 5 |
| Interpolation | Optimized 8-tap |
| Grid Calibration | 5 mm |
| Calibration Score | 0.025 |
| Filer Size and Type | 9 (Lagrange) |
| Stereo angle | 14 degrees |

2.4 Experimental Strain Gauge Data

FIGS. 3A through 6C illustrate respective typical wave signal graphs for respective crack angle examples of: (A) $\beta_{sp}=0°$, (B) $\beta_{sp}=11.25°$, and (C) $\beta_{sp}=45°$.

Figure 6A:
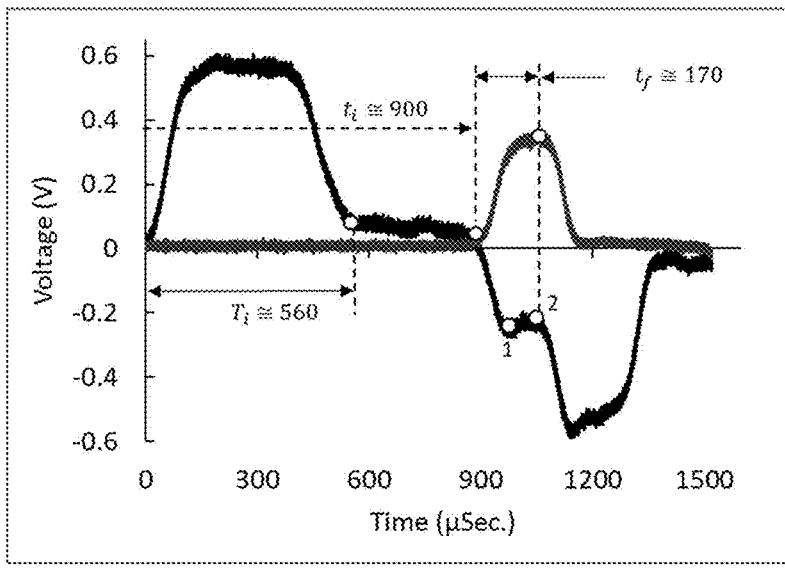
Figure 6B:
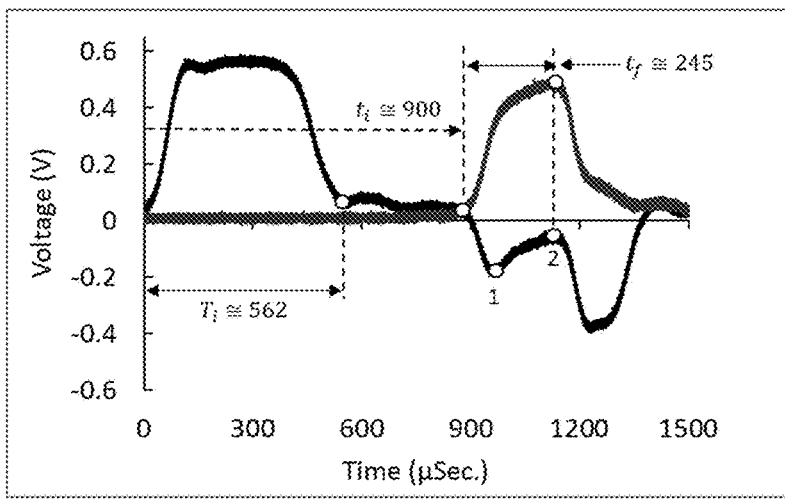
Figure 6C:
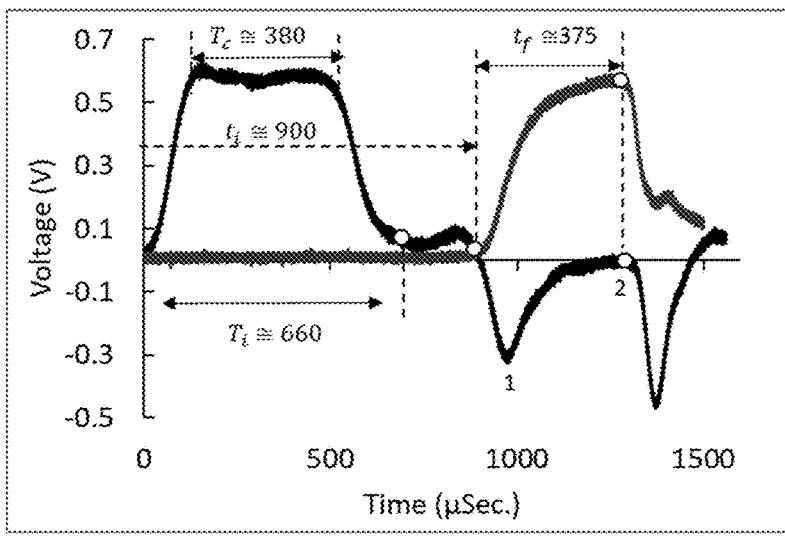

The typical incident, reflected, and transmitted signals from strain gauges for three different spiral crack angle configurations for $\beta_{sp}=0°$, 11.25°, and 45° are shown in FIG. 6. The specimen with spiral angles at 0° as shown in FIG. 6A represents a pure Mode-III. The rise time of the incident wave is about $t_r \cong 95$ μsec. The fracture is initiated at about $t_r \cong 170$ μsec as shown in the transmitted signal. Right after crack initiation, a large portion of the incident wave is reflected, as shown in the reflected wave. FIG. 6B shows a typical signal of Mixed Mode fracture for the spiral crack angle $\beta_{sp}=11.25°$. The rise time of the incident wave remains almost the same compared with the $\beta_{sp}=0°$. However, the fracture initiation time has increased to about $t_r \cong 245$ μsec. FIG. 6C shows a specimen with a spiral crack angle is $\beta_{sp}=45°$, and it represents a pure Mode-I of fracture. The rise time of the incident wave remains about the same at $t_r$ 95±5 μsec, however, the fracture initiation time increases to $t_r \cong 375$ μsec. It should be noted here that since the effective length of the specimens is increasing, the stored portion of the incident bar has to be kept longer to increase the period of the incident wave without altering the amplitude. As shown in FIG. 6C, the period of the incident wave is higher by about ~100 μsec compared with the $\beta_{sp}=0°$, and 11°

In all experimental works, the dynamic fracture initiation accrued at the time point below the maximum value of the transmitted wave, about 99% of the peak value. Furthermore, the transmitted wave signals are changing according to the specimens' size and the spiral crack pitch length.

3. NUMERICAL SOLUTION

The dynamic interaction integral equation developed above was solved numerically by using commercial software Abaqus SIMULIA™ 2017. The numerical version of the dynamic interaction integral is shown in Eq. (20) (Vargas and Robert, H. Dodds 1993; Walters et al. 2006). The stresses, strains, and displacement were calculated and assembled with a standard Gauss quadrature procedure at all the integration points in each element inside the volume domain.

$$J_{Inter.}^\alpha = \sum_V^{elements} \sum_{element}^{G.Q.P} [(\sigma_{ij}(t)(u_{i,1}^{aux}(t))^\alpha + (\sigma_{ij}^{aux}(t))^\alpha u_{i,1}(t) - \frac{1}{2}\sigma_{ij}(t)(\varepsilon_{ij}^{aux}(t))^\alpha - \frac{1}{2}(\sigma_{ij}^{aux}(t))^\alpha \varepsilon_{ij}(t))q_{,i} \det J]_p w_p \tag{20}$$

In Eq. (20), G. Q. P is a Gaussian quadrature integration point at each element, $w_p$ is respective weight function at each integration point, [ . . . ]$_p$ is evaluated at Gauss points (Kuna 2013), and det J is determinant of Jacobian for 3D coordinates. The FE commercial software Abaqus Standard Dynamic-Implicit 2017 was used to solve Eq. (20). Additional details for the numerical solution method are available in the open literature; for examples, see (Dodds and Vargas 1988; Walters et al. 2006; Kuna 2013).

3.1 Finite Element Model

Figure 7A:
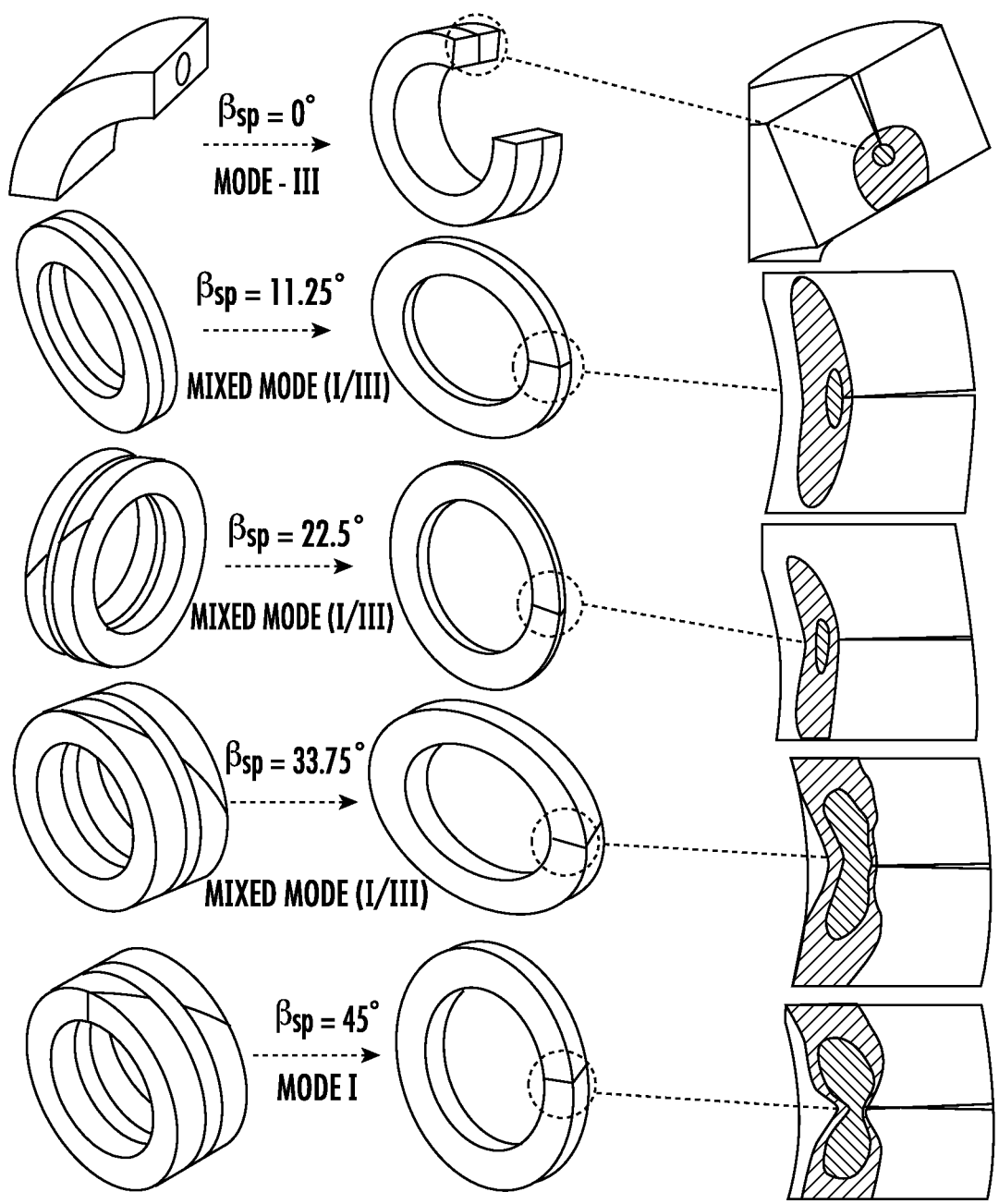
FIG. 7 illustrates respective 2finite element models of spiral cracks and stress profiles around crack tips for the respective spiral crack angular examples each illustrated or referenced in FIGS. 2A, 3, and 4.

A numerical method is performed to calculate the dynamic stress intensity factor, as presented in Eq. (14). Due to the nature of the torsional load, which is uniform along the spiral length, modeling a quarter section of the specimen is sufficient (Kidane and Wang 2013; Fahem and Kidane 2018). A commercial finite element software Abaqus-Dynamic was used to solve a finite element model of a quarter spiral crack specimen and with the incident and transmitted Hopkinson torsional bars (SIMULIA™ 2017). The typical finite element model for the different spiral crack angles is shown in FIG. 7A. In particular, FIG. 7A illustrates respective finite element models of spiral cracks and stress profiles around crack tips for the respective spiral crack angular examples each illustrated or referenced in FIGS. 2A, 3, and 4. For the specimen's model, a circular tube with 19 mm external and 12.7 mm internal diameters are considered. The tube cross-section extruded for a suitable length, as shown in Table (5).

TABLE 5

Specimen Length used in FE model

| $\beta_{sp}$ | 45.00° | 33.75° | 22.50° | 11.25° | 0.00° |
|---|---|---|---|---|---|
| Model Length | 14.97 mm | 9.96 mm | 6.18 mm | 2.97 mm | — |
| Fracture Mode | Mode-I | Mode (I/III) | Mode (I/III) | Mode (I/III) | Mode-III |

A shell revolve was used to make a spiral seam crack along the specimen length with all models. Since the J-integral is the base of the integral interaction method, the very refine mesh around the crack tip is not required since the J-integral is path independent (Kuna 2013). The middle volume of the solid cylinder was divided into a sufficient number of elements that generated a robust mesh around the crack tip, as shown in FIG. 7A. The model was built with a 3D solid structure quadratic hexahedral C3D20R element.

Figure 7B:
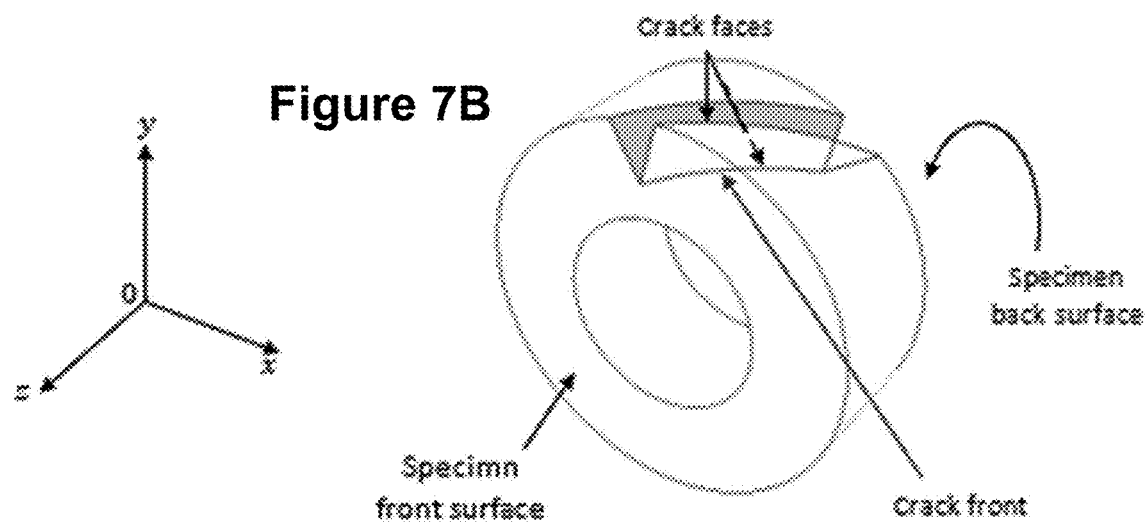

The incident torque measured experimentally was used as input to the finite element model. The boundary conditions are applied in the specimen in FIG. 7B as follows: First, one end of the bar (Front surface) was fixed in three dimensions (x, y, and z). Second, the impulse torsional load was applied on the other end (back surface) as a moment load (Fahem and Kidane 2017, 2018).

The dynamic stress profile at the fracture initiation time, $t_f$, around the crack tip from pure Mode-III to pure Mode-I throughout the transition Mixed Mode are shown in FIG. 7A. FIG. 7A shows clearly the gradual change of stress profile from pure Mode-III, through Mixed Mode (I/III), up to pure Mode-I.

Figure 7C:
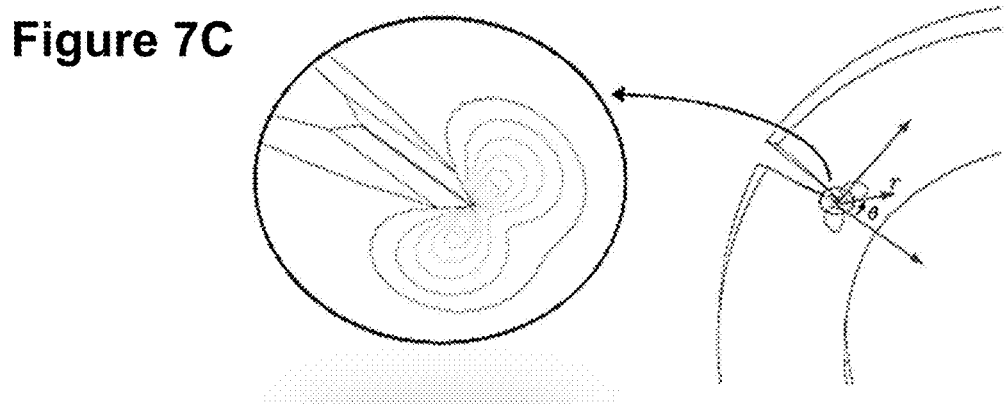
Figure 7D:
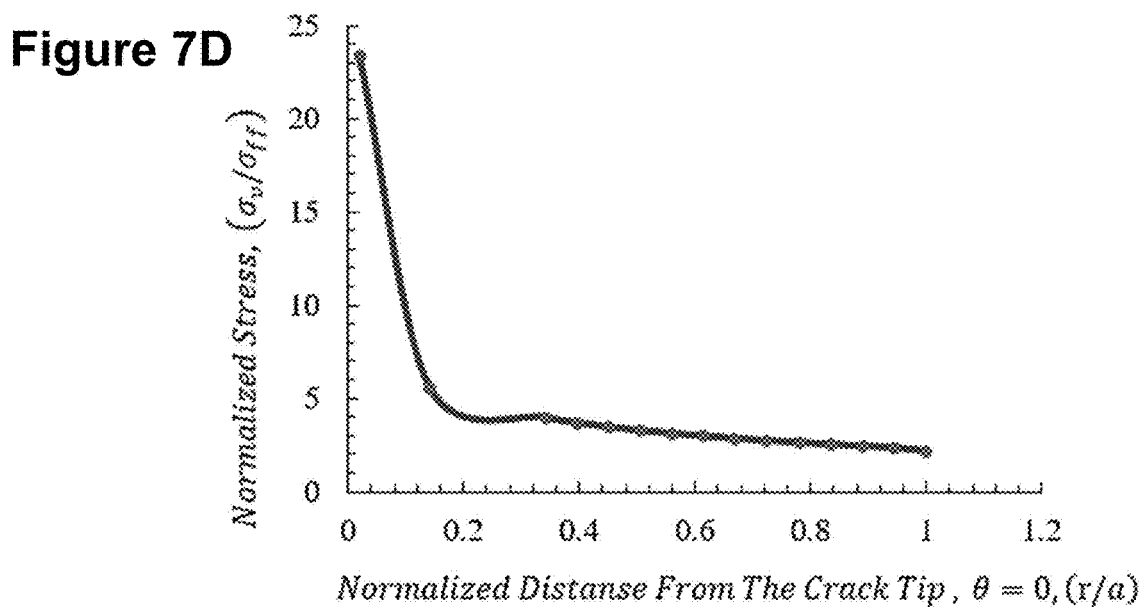

The typical numerical result of a stress contour distribution around the crack tip is shown in FIG. 7C. FIG. 7C shows a full field of the stress result at the time of crack initiation, which is similar to the static stress profile under plane strain condition. The normalized stress, (von Mises stress, $\sigma_v$/Far-Field Stress, $\sigma_{ff}$), versus normalized distance from the crack tip along the crack ligament, a, is illustrated in FIG. 7D.

4. RESULTS AND DISCUSSION

The dynamic interaction integral, dynamic stress intensity factor, and numerical solutions that were discussed in the previous sections are used to estimate the dynamic initiation fracture toughness of materials with different spiral crack inclined angles. In this work, the temperature effect is neglected, and the crack assumes to be a stress-free surface and a linear elastic isotropic material. Furthermore, the dynamic interaction integral-dynamic stress intensity factor terms are presented at each crack point on the crack front and assuming the axial inertia force is too small and is discarded inside the integral domain. The results are presented in three subsections: 1) fracture initiation time measuring; 2) dynamic stress intensity factor and dynamic initiation fracture toughness; and 3) the effect of both loading rate and spiral angle on the Mixed Mode fracture values.

4.1 Time of Fracture Initiation $t_f$

The first main parameter to measure is the initiation time of the fracture $t_f$. The fractured time was measured by two experimental methods: strain gage signal and 3D-DIC. With the strain gages signals, the fracture initiation time was identified at the location where sudden change in the transmitted and reflected signals are occurring. The stereo digital image correlation was used to measure the Crack Mouth Opening Displacement (CMOD) as given by Eqs. (19.1-19.3). Using the DIC data, the displacement of the crack edge at two points (upper ($ECD_0$) and lower edge ($ECD_1$)) across the crack line was measured to calculate the CMOD.

Figure 8:
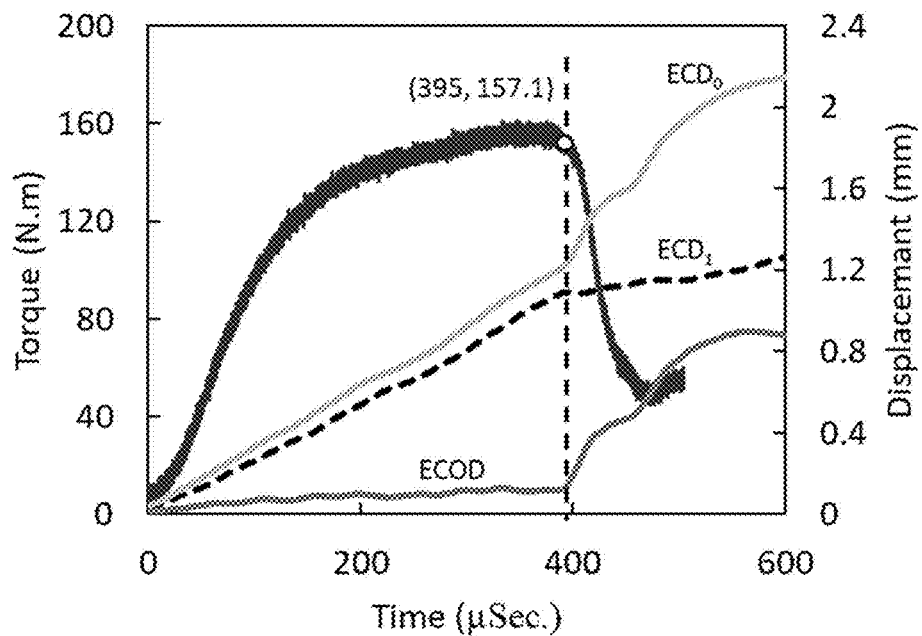
FIG. 8 graphically illustrates typical Digital Image Correlation (DIC) and strain gages data versus initiation times for a representative 45° test specimen.

FIG. 8 graphically illustrates typical Digital Image Correlation (DIC) and strain gages data versus initiation times for a representative 45° test specimen. In particular, typical transmitted strain gage data (in terms of applied torque), the edge crack displacements, and the CMOD for the specimen with the spiral angle of 45° are plotted in FIG. 8. As shown in FIG. 8, there is a distinct future in all the plots around ~395 μsec indicating the fracture initiation time. The fracture initiation time was proved to be very consistent based on a number of repeated experiments.

Figure 9:
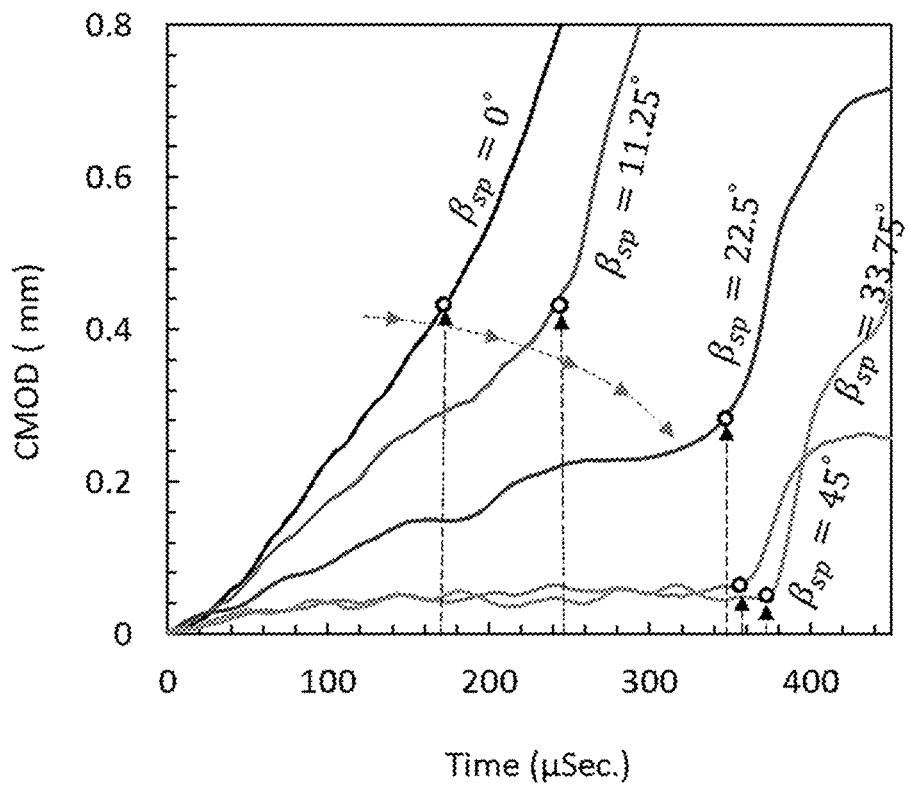
FIG. 9 graphically illustrates Crack Mouth Opening Displacement (CMOD) data versus time, for respective spiral crack angular examples each illustrated or referenced in FIGS. 2A, 3, and 4.

FIG. 9 graphically illustrates Crack Mouth Opening Displacement (CMOD) data versus time for respective spiral crack angular examples, each illustrated or referenced in FIGS. 2A, 3, and 4.

Figure 10:
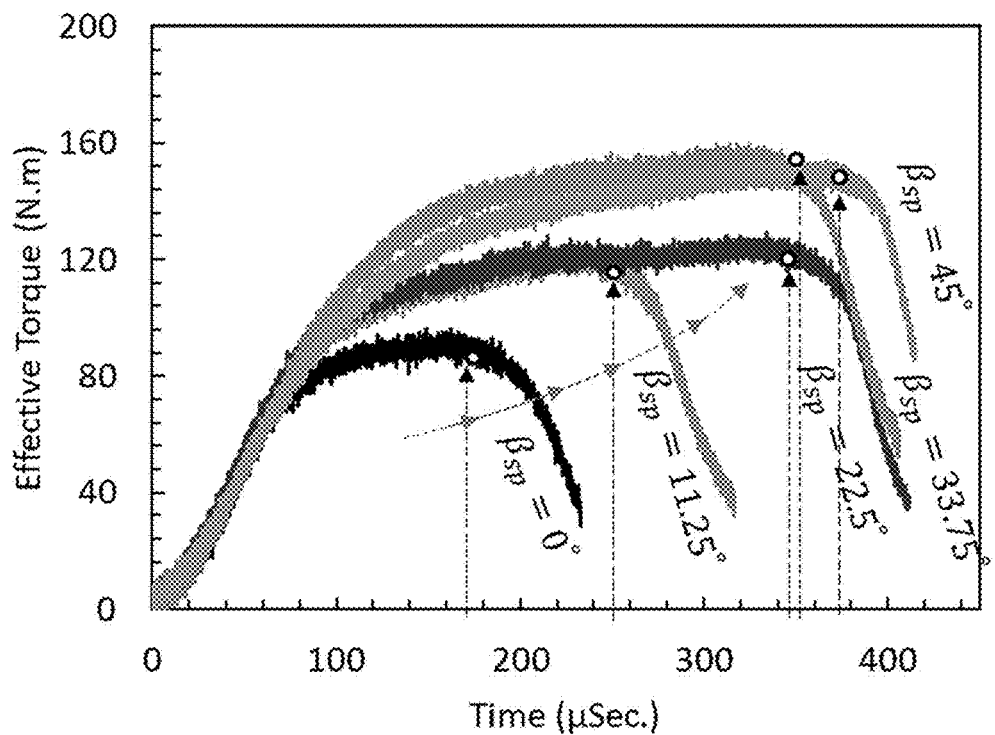
FIG. 10 graphically illustrates Effective Fracture Torsional Load data versus time, for respective spiral crack angular examples each illustrated or referenced in FIGS. 2A, 3, and 4.
Figure 11A:
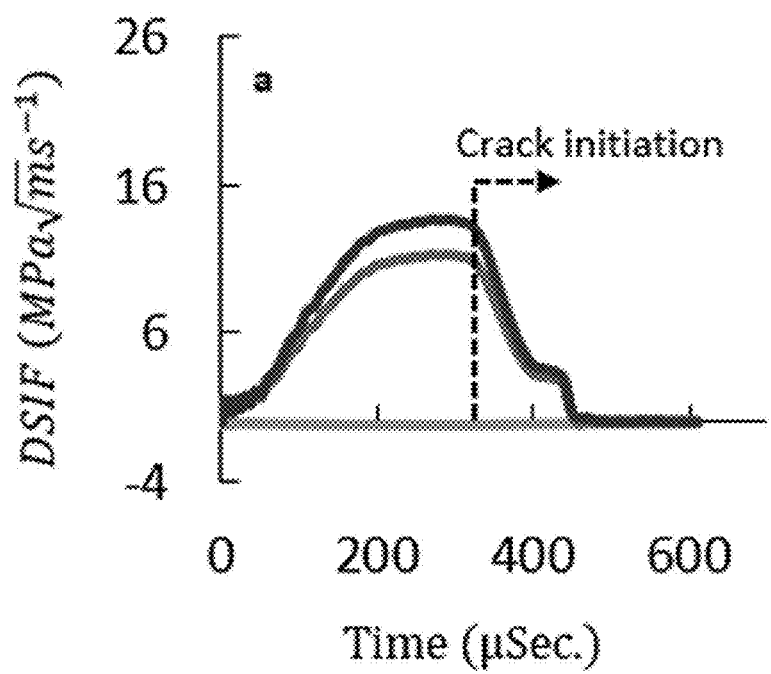
FIGS. 11A through 11E respectively graphically illustrate Dynamic Stress Intensity Factors for respective spiral crack angle examples of: (A) Pure Mode-III ($\beta_{sp}=0.0°$), (B) Mixed Mode I/III ($\beta_{sp}=11.25°$), (C) Mixed Mode I/III ($\beta_{sp}=22.5°$), (D) Mixed Mode I/III ($\beta_{sp}=33.75°$), and (E) Mode-I ($\beta_{sp}=45°$)
Figure 11B:
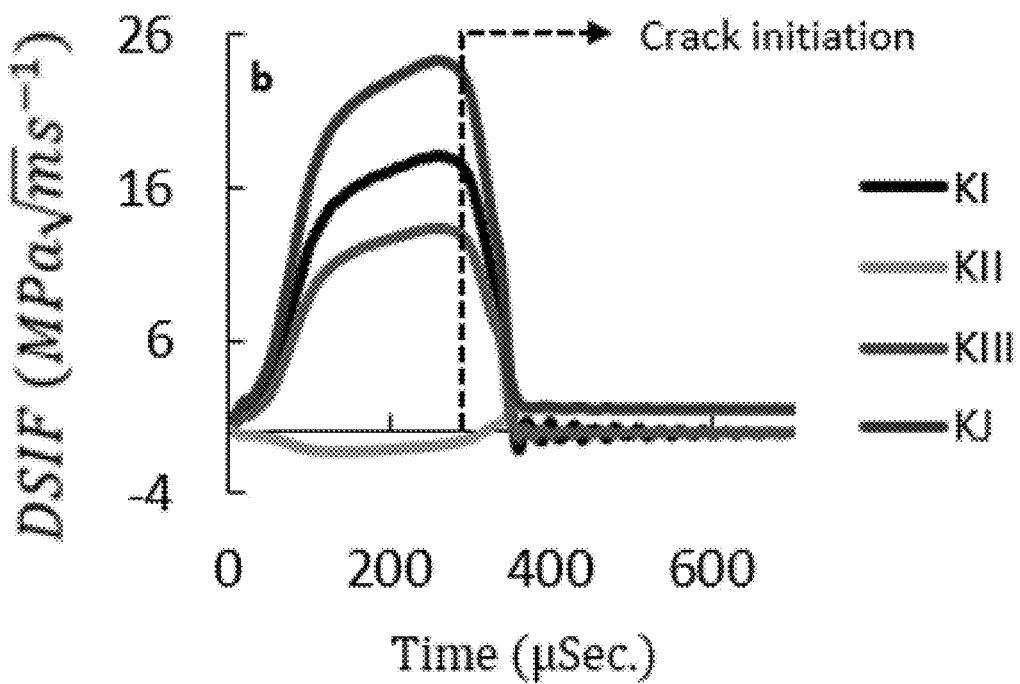
Figure 11C:
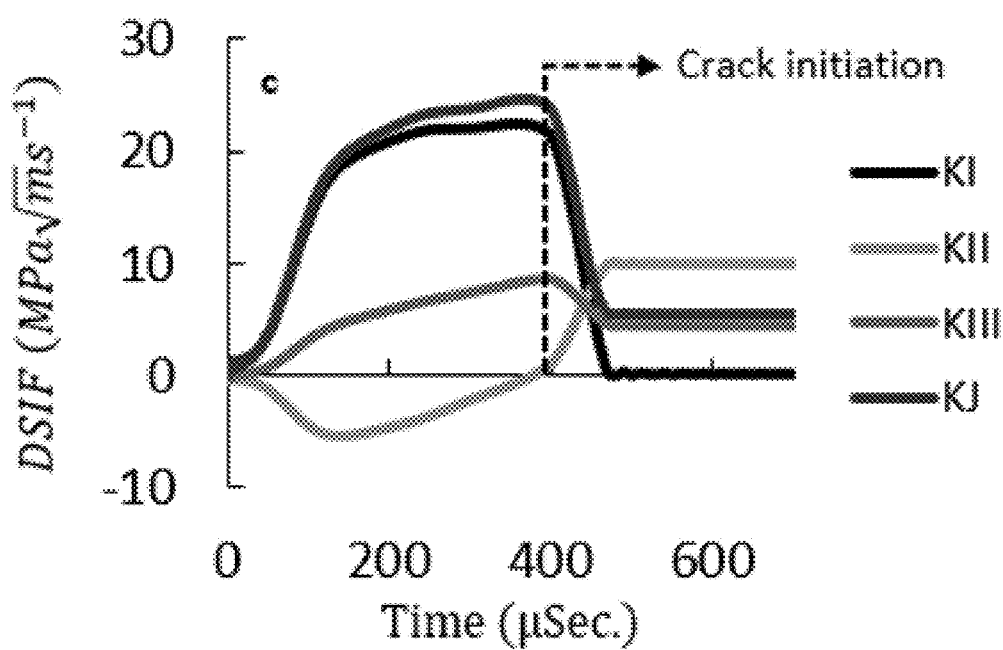
Figure 11D:
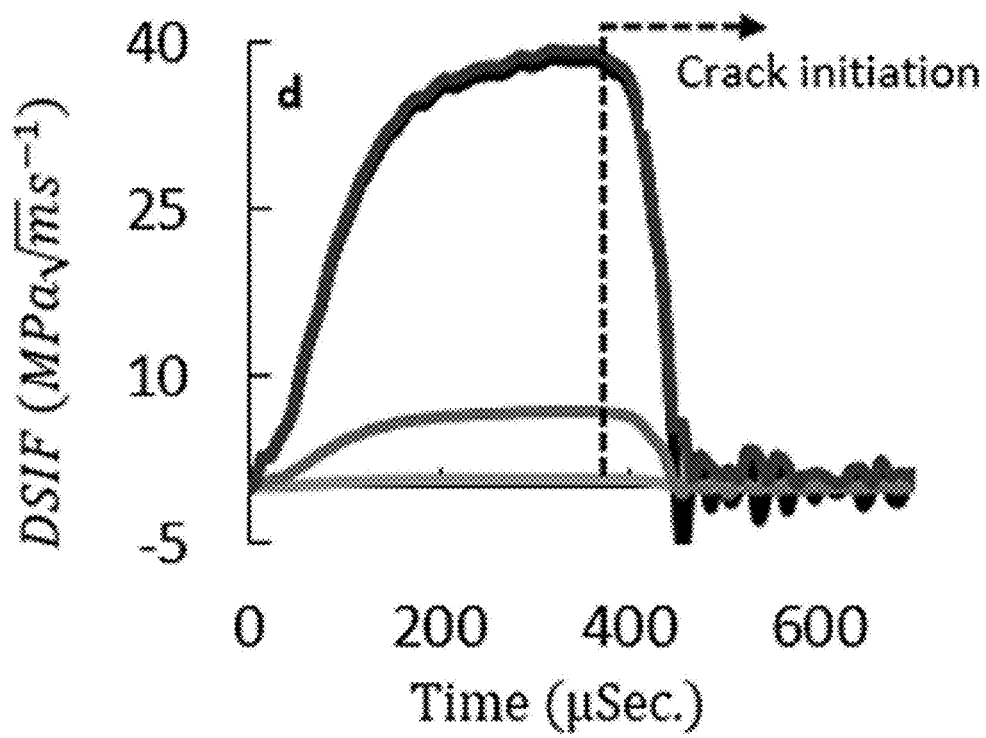
Figure 11E:
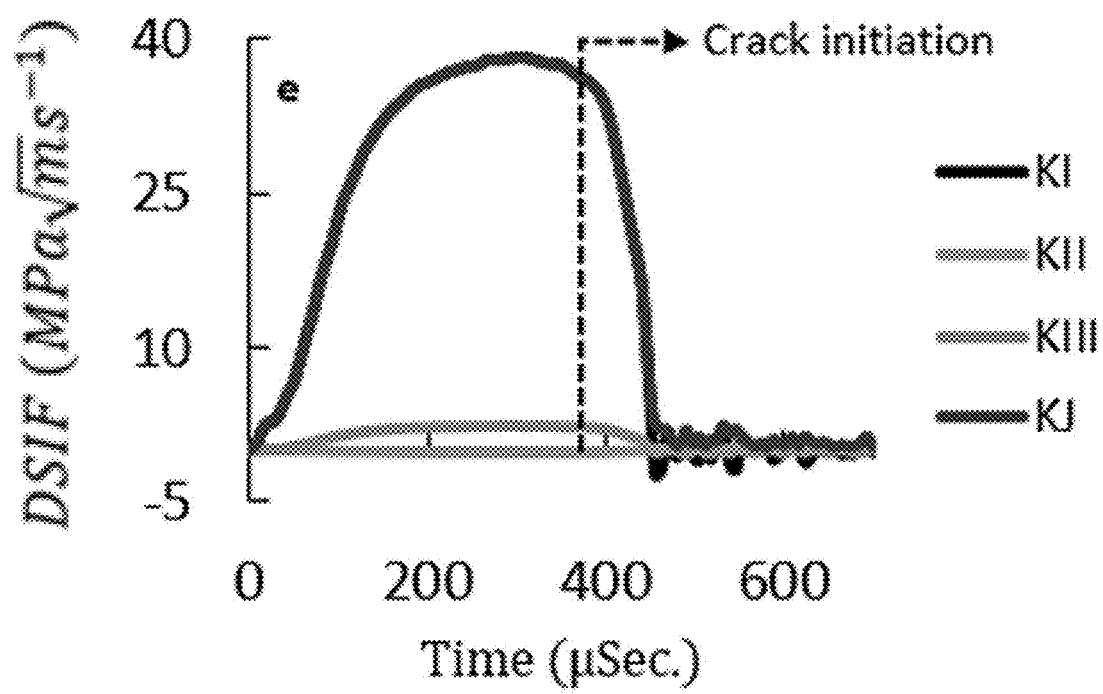

FIG. 10 graphically illustrates Effective Fracture Torsional Load data versus time for respective spiral crack angular examples, each illustrated or referenced in FIGS. 2A, 3, and 4.

Typical CMOD and effective torque for all spiral crack angles $\alpha_{sp}$=0°, 11.25°, 22.5°, 33.75°, and 45° are shown in FIG. 9 and FIG. 10, respectively. As shown in FIG. 9, in all the cases, there is a distinct change and a sharp increase in the slope of the CMOD at the time of fracture initiation. It is also apparent from the plots shown in FIG. 9 and FIG. 10 that the crack initiation time (incubation time) increases as the spiral angle increases from 0° to 45°. The results of fracture time for Aluminum 2024-T3 related to a range of spiral angle and fracture modes are shown in Table 6. During the incubation time, for fracture subjected to a constant strain rate, the microcrack developed, and finally, unstable crack initiation and propagation happened. The effective torque plot shown in FIG. 10, indicates that, as the angle changes from 0° to 45° degree, the influence of Mode-I increases.

TABLE 6

Initiation Fracture Time Related to Spiral Angle

| $\beta_{sp}$ | 45° | 33.75° | 22.5° | 11.25° | 0° |
|---|---|---|---|---|---|
| $t_f$(μsec) | 375 | 350 | 345 | 245 | 170 |
| Fracture Mode | Mode-I | Mode (I/III) | Mode (I/III) | Mode (I/III) | Mode-III |

4.2 Dynamic Stress Intensity Factor and Fracture Toughness

FIGS. 11A through 11E respectively graphically illustrate Dynamic Stress Intensity Factors for respective spiral crack angle examples of: (A) Pure Mode-III ($\beta_{sp}=$) 0.0°, (B) Mixed Mode I/III ($\beta_{sp}=11.25''$), (C) Mixed Mode I/III ($\beta_{sp}=22.5''$), (D) Mixed Mode I/III ($\beta_{sp}=33.75''$), and (E) Mode-I ($\beta_{sp}=45°$).

In particular, the dynamic stress intensity factor of Aluminum 2024-T3 as a function of time for all the spiral angles considered obtained from the finite element analysis are given in FIGS. 11A through 11E, respectively. As shown in the Figures, as expected, Mode-II is almost zero for all cases, with a maximum error of 0.17% of the total fracture load. At 0° spiral angle, the fracture is governed by Mode-III, with almost no contribution from Mode-I. As the angle changes from 0° to 45°, the contribution of Mode-I becomes apparent. Finally, at 45°, the fracture becomes dominated by Mode-I. Since the fracture initiation time is known, as discussed above, the dynamic fracture initiation toughness and the stress intensity corresponding to the initiation instant are obtained and given in Table 7. The quasi-static fracture toughness ($K_{Ic}$) of Aluminum 2024-T3 is 29.1 MPa$\sqrt{m}$, and it used to compare with the dynamic fracture toughness results obtained in this study.

TABLE 7

Dynamic Fracture Initiation Toughness of Aluminum 2024-T3

| Fracture Mode | Spiral Angle (Degree) | Dynamic Initiation Toughness (MPa$\sqrt{m}$) | | | | | % Error$_{(K_{IId})}$ |
|---|---|---|---|---|---|---|---|
| | | $K_{Id}$ | $K_{IId}$ | $K_{IIId}$ | $K_{(I/II/III)d}$ | $K_{(I/III)d}$ | |
| III | 00.00 | 9.E−5 | 1E−4 | 13.00 | 15.88 | 15.88 | 0.0001 |
| I + III | 11.25 | 18.10 | 1.20 | 12.89 | 24.02 | 23.99 | 0.1200 |
| I + III | 22.50 | 22.49 | 0.80 | 08.60 | 24.84 | 24.82 | 0.0500 |
| I + III | 33.75 | 35.00 | 0.50 | 07.88 | 36.30 | 36.29 | 0.0100 |
| I | 45.00 | 38.10 | 0.70 | 03.10 | 38.29 | 38.28 | 0.0100 |

For pure Mode-III fracture with a circumferential crack with $\beta_{sp}=0°$, the dynamic fracture initiation toughness is 13 MPa$\sqrt{m}$, which is less than the quasi-static fracture toughness $K_{Ic}$. The material can fail with tearing (Mode-III) under dynamic loading conditions at a value of less than 33% of the quasi-static fracture toughness value.

As the spiral crack angle increased to $\beta_{sp}=11.25°$, the Mode-I contribution started to appear quickly and Mode I become higher than Mode-III, $K_{Id}=18.10$ (MPa$\sqrt{m}$), $K_{IIId}=12.89$ (MPa$\sqrt{m}$), and the total Mixed-mode fracture $K_{md}=K_{(I/III)d}=20.53$ (MPa$\sqrt{m}$). At this angle, the total fracture toughness is still lower than the Mode-I quasi-static fracture toughness value.

Figure 12A:
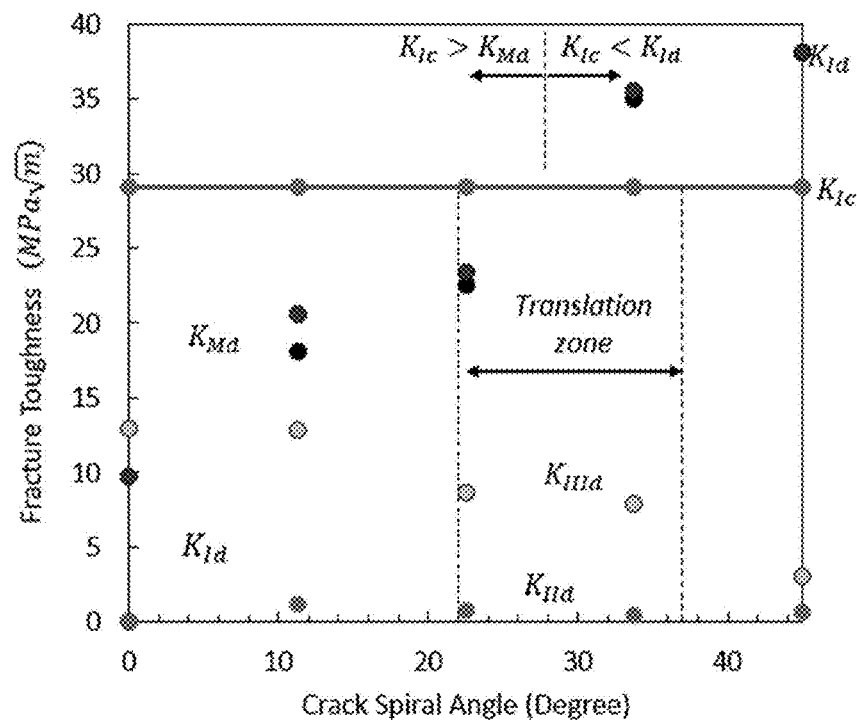
FIG. 12A graphically illustrates variations of Dynamic Mode-I, Mode-II, Mode-III, and Mixed Mode (M) of fracture toughness versus respective spiral crack angular examples each illustrated or referenced in FIGS. 2A, 3, and 4.
Figure 12B:
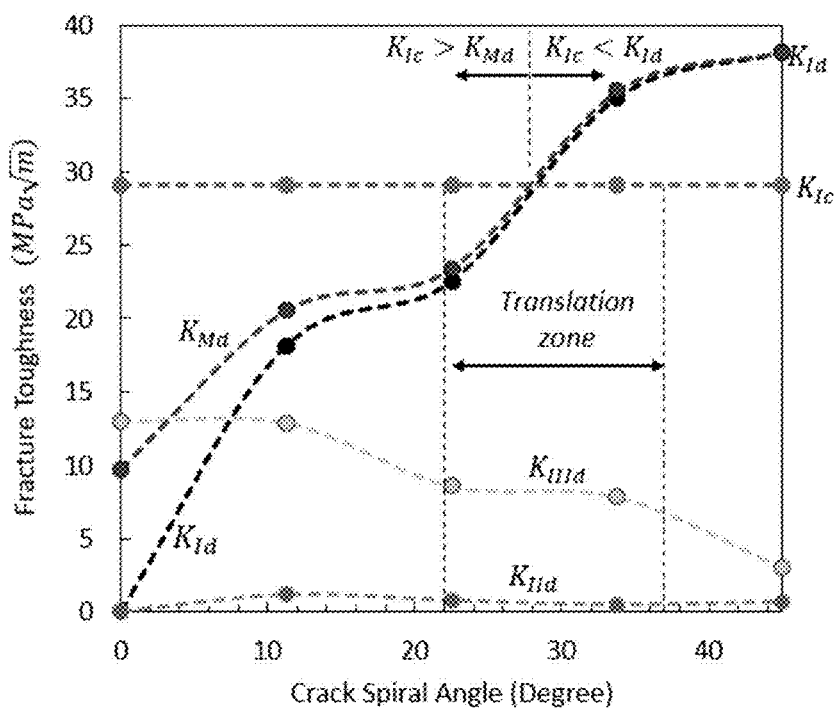
FIG. 12B is a repeat of the graphical illustrations of FIG. 12A, with added graph lines to interconnect respectively related data points.

FIG. 12A graphically illustrates variations of Dynamic Mode-I, Mode-II, Mode-III, and Mixed-mode (M) of fracture toughness versus respective spiral crack angular examples each illustrated or referenced in FIGS. 2A, 3, and 4. FIG. 12B is a repeat of the graphical illustrations of FIG. 12A, with added graph lines to interconnect respectively related data points.

As shown in FIG. 12A, when the spiral angle increases further from 11.25° to 22.5°, the contribution of Mode-I becomes dominant, and the contribution of Mode-III become weaker. However, the dynamic Mixed-mode fracture toughness is still lower than the quasi-static Mode-I fracture toughness until the spiral angle is more than 22.5°. The specimen with a spiral angle between 22.5° to 33.75° can be considered as a translation zone. In this range, the contribution of Mode-I becomes above 90%. In addition, at the spiral angle of 33.75°, the dynamic Mixed-mode fracture toughens become higher than the quasi-static Mode-I fracture toughness. As a spiral crack angle further increases, the contribution of Mode-I increased from 96% at $\beta_{sp}=33.75°$ to 99.8% at $\beta_{sp}=45°$.

The spiral crack angles show a critical effect on the dynamic initiation fracture toughness behavior. With a spiral angle between $10°\leq \beta_{sp} \leq 20°$, the Mixed-mode of fracture can be measured easily. For the spiral crack at an angle less than $\beta_{sp}=5°$, the result is almost close to pure Mode-III. When the spiral crack angle $\beta_{sp}\geq 28°$, Mode-I has the most significant effect on the total fracture driving force; even Mode-III shows a slight effect that came from the numerical solution error, which cannot be avoided. The loading rate of fracture that develops with a spiral crack angle shows more significant results, as shown in the next section.

4.3 Loading Rate and Dynamic Fracture Toughness

A loading rate parameter is used in dynamic fracture mechanics instead of strain rate due to the singularity field at the crack tip. The loading rate, $$\dot{K} = \frac{K}{t_f} (\text{Pa}\sqrt{m}/s),$$

provides the measure of loading applied per time around the crack tip, and it has a similar unit of stress intensity factor K, where $t_f$ is a fracture initiation time. In dynamic fracture mechanics, the loading rate can be divided into two categories: intermediate loading rate at 1.0 (MPa$\sqrt{m}$/s)$<\dot{K}\leq 100$ (GPa$\sqrt{m}$/s), and high and very high loading rate at $\dot{k}\geq 100$ (GPa$\sqrt{m}$/s).

Figure 13:
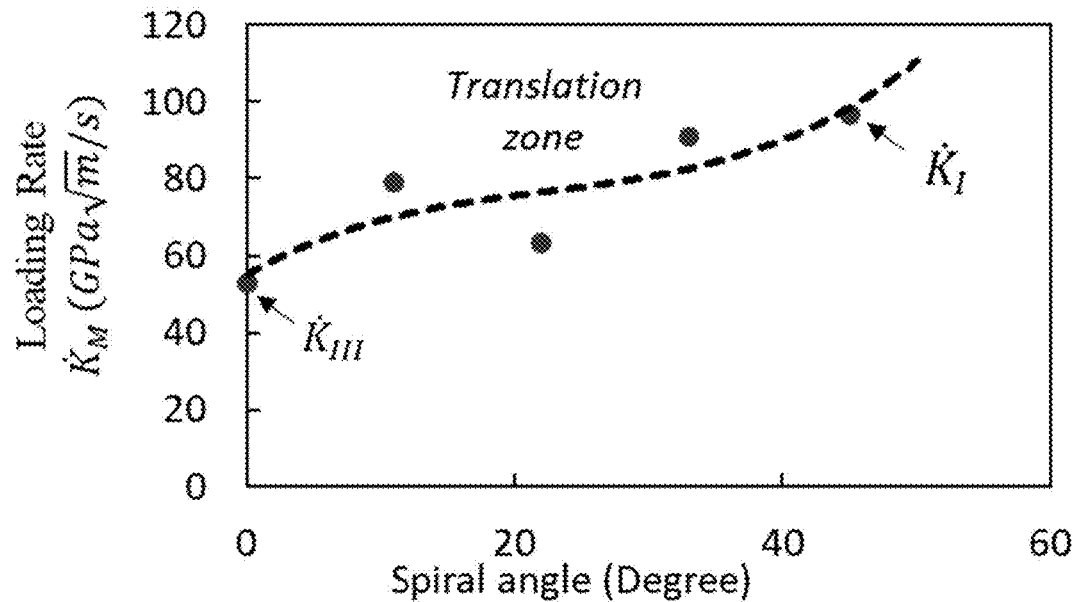
FIG. 13 graphically illustrates variations of loading rate effects versus respective spiral crack angular examples each illustrated or referenced in FIGS. 2A, 3, and 4.

FIG. 13 graphically illustrates variations of loading rate effects versus respective spiral crack angular examples, each illustrated or referenced in FIGS. 2A, 3, and 4. In particular, for spiral crack specimens under far-field torsional load, for the same load, the loading rate varies depending on the spiral crack angles, as shown in FIG. 13. In this study, for the same load, for pure Mode-III $\beta_{sp}=0°$, the loading rate was $\dot{K}_{III}\cong 50$ (GPa$\sqrt{m}$/s), and as the spiral angle crack increased $\beta_{sp}=45°$, the loading rate increased to $\dot{K}_I=105$ (GPa$\sqrt{m}$/s). At the transition zone, the range of loading rate can vary 65 (GPa$\sqrt{m}$/s)$\leq \dot{K}_{(I/III)} \leq 100$ (GPa$\sqrt{m}$/s).

Figure 14:
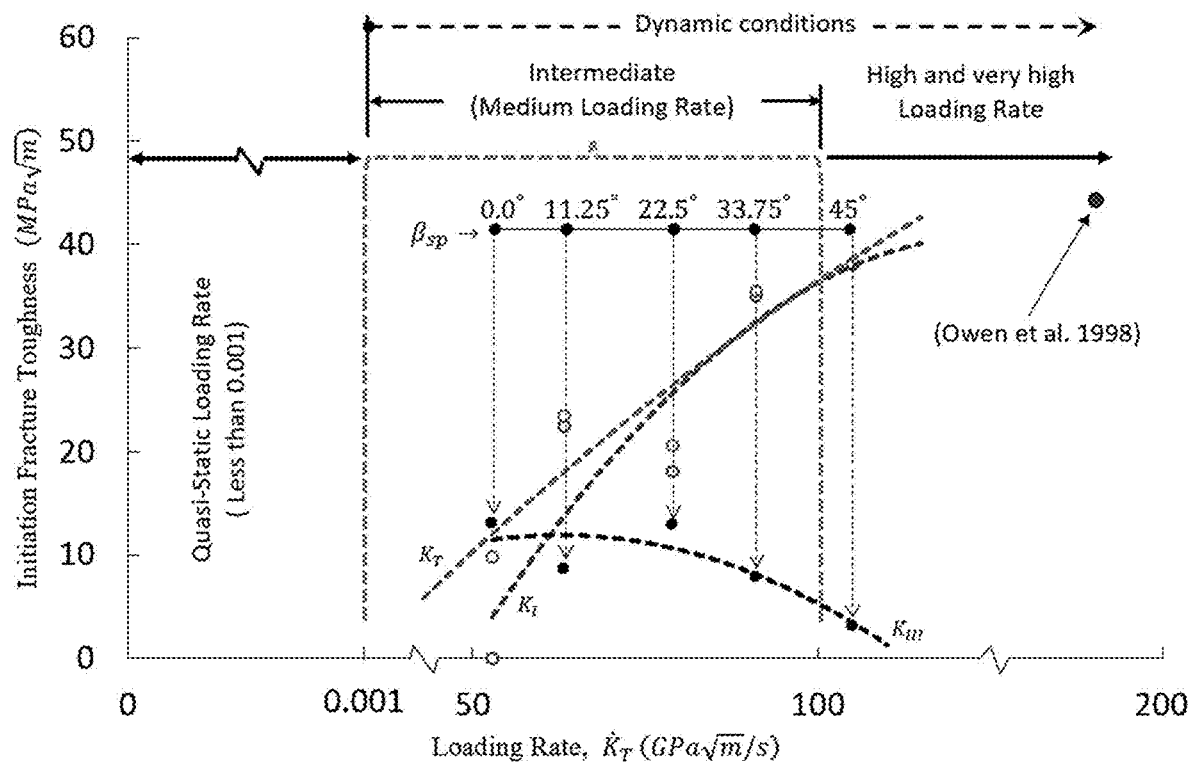
FIG. 14 graphically illustrates variations of loading rate effects versus respective initiation fracture toughness data for respective spiral crack angular examples, each illustrated or referenced in FIGS. 2A, 3, and 4.

FIG. 14 graphically illustrates variations of loading rate effects versus respective initiation fracture toughness data for respective spiral crack angular examples, each illustrated or referenced in FIGS. 2A, 3, and 4. In particular, the Mixed Mode dynamic fracture initiation toughness as a function of the loading rate is given in FIG. 14. As shown in FIG. 14, the Mode-I and total Mixed Mode dynamic fracture toughness increased; however, the Mode-III dynamic fracture toughness decreased with a loading rate and spiral angle. In our laboratory, with available equipment, the maximum loading rate can be generated limited to $\dot{K}_M\cong 50 \rightarrow 105$ (GPa$\sqrt{m}$/s). With a higher capacity twisting machine and better clamping mechanism, a much higher loading rate can be achieved. Looking at the spiral angles 37.5° and 45°, both dominated by Mode-I, it safe to say that the dynamic fracture toughness is loading rate sensitive. Also, comparing $K_{ID}\cong 29$ (MPa$\sqrt{m}$), the quasi-static fracture initiation toughness, with $K_{Id}\cong 38.1$ (MPa$\sqrt{m}$), dynamic fracture toughens at a loading rate $\dot{K}_m \cong 105$ (GPa$\sqrt{m}$/s), and thus, there is a 30% increase in the fracture value. The dynamic fracture toughness obtained in this study at $\dot{K}_m \cong 105$ (GPa$\sqrt{m}$/s) is very comparable with Owen's result (Owen et al. 1998) of dynamic fracture toughness $K_{Id}$=46 (MPa√m) at a high loading rate $\dot{K}_I$=200 (GPa√m/s).

5. CONCLUSION

To understand the dynamic Mixed-mode (I/III) of ductile materials, a series of dynamic experiments were performed to investigate spiral crack specimens from pure Mode-III up to pure Mode-I throughout the dynamic Mixed-mode (I/III) of fracture under pure impulse torsional load. A torsional Hopkinson Bar was used to generate a torsional impulse load. One-dimension wave propagation theory was used to measure a far-field maximum fracture load. The dynamic stress intensity factors of a spiral crack with different crack angles, $\beta_{sp}$, are developed under pure torsional load. Dynamic fracture initiation properties of Mode-I, Mode-III, and Mixed-mode (I/III), $K_{Id}$, $K_{IIId}$, and $K_{Md}$, are calculated numerically through the dynamic interaction integral. A 3D-DIC method was used to measure the CMOD and to monitor the fracture initiation time $t_f$. The dynamic effective initiation fracture toughness results were considered and compared for different crack angles. The following important points were observed for dynamic Mixed Mode fracture dependent on the results:

- The average of Mode-I, Mode-III and Mixed-mode (I/III) dynamic fracture initiation toughness of Aluminum 2024-T3 are loading-rate dependent.
- As a spiral crack angle increased $\beta_{sp}$=0°→45°, the elastic deformation on Mode-III is larger than the elastic deformation on the pure Mode-I that was subjected to the same far-field torsional dynamic load.
- The dynamic fracture load is increased when the fracture mode transfer forms pure Mode-III to a pure Mode-I and the fracture initiation time increases. In other words, the Mode-I requires more time and more load to initiation than the Mode-III $$\frac{T_{fIII}}{T_{fI}} \cong 0.6.$$

- The materials can include initiation more easily with a tearing mode than the opening mode at the intermedia dynamic loading rate $\dot{K}_{(I/III)} \cong 50$ (GPa√ms).
- With all spiral angles, the maximum fracture load value develops after the rising time, i.e., $t_f > t_r$, and the fracture loading increases exponentially with a spiral crack angle.
- With a spiral crack angle more than 33.75°, the fracture initiation time is almost the same; however, the fracture load is different.
- The dynamic fracture initiation toughness of Mode-I increases as a spiral crack increases, while Mode-III decreases. The maximum dynamic fracture toughness of Mode-III is $K_{IIId} \cong 13$ (MPa√m) at the loading rate $\dot{K}_{III} \cong 50$ (GPa√ms), while Mode-I is $K_{Id} \cong 38$ (MPa√m) at the loading rate $\dot{K}_I \cong 105$ (GPa√ms).
- At the middle point between the Mode-I and Mode-III angles, i.e., $\beta_{sp}$=22.5°, the maximum Mixed-mode is $K_{(I/III)d} \cong 23.41$ (MPa√mn) at the loading rate $\dot{K}_{(I/III)d} \cong 70$ (GPa√ms), while $K_{Id} \cong 22.49$ (MPa√m), and $K_{IIId} \cong 8.6$ (MPa√m).
- Dynamic fracture initiation toughness of Mode-I is larger than the static fracture toughness, i.e., $K_{Id} \cong 1.31 K_{Ic}$ at a high loading rate $\dot{K}_I$=105 (GPa√ms).
- For a spiral crack specimen, the loading rate is a function of the dynamic stress intensity factor (DSIF), initiation time $t_f$, and spiral angles $\beta_{sp}$. Furthermore, the loading rate can be developed around the crack front, starting from intermediate to high loading levels. The dynamic initiation toughness of Aluminum 2024-T3 is nonlinear and increased exponentially with the loading.
- The error from Mode-II of fracture mechanics is less than 1.7%. The error may develop from the physical experimental issues and finite element boundary conditions effect. However, that error is too small, and it can be neglected.
- The spiral crack with different inclined angles can be used to test a fracture of materials behavior with a different loading rate, and a higher loading rate can be achieved with more equipment. The spiral crack specimen opened a new window to test the dynamic fracture of material with different loading rates and Mixed Mode.

This written description uses examples to disclose the presently disclosed subject matter, including the best mode, and also to enable any person skilled in the art to practice the presently disclosed subject matter, including making and using any devices or systems and performing any incorporated methods. The patentable scope of the presently disclosed subject matter is defined by the claims and may include other examples that occur to those skilled in the art. Such other examples are intended to be within the scope of the claims if they include structural elements that do not differ from the literal language of the claims, or if they include equivalent structural elements with insubstantial differences from the literal language of the claims.

REFERENCES

Barnett D M, Asaro R J (1972) The Fracture Mechanics of Slit-like Cracks in Anisotropic Elastic Media. J Mech Phys Solids 20:353-366.

Chao Y J, Liu S (1997) On the Failure of Cracks Under Mixed Mode Loads. Int J Fract 87:201-223.

Chao Y J, Wang C, Kim Y, Chien C-H (2010) Relationship Between Crack-Tip Constraint and Dynamic Fracture Initiation Toughness. J Press Vessel Technol 132:021404.

Chen W, Bo S (2011) Split Hopkinson (Kolsky) Bar Design, Testing and Application. Springer Chong K P, Kuruppu M D (1988) New Specimens for Mixed Mode Fracture Investigations of Geomaterials. Eng Fract Mech 30:701-712.

Deng X (1994) The Asymptotic Structure of Transient Elastodynamic Fields at the Tip of a Stationary Crack. 446:1-13.

Dodds R H, Vargas P M (1988) Numerical Evaluation of Domain and Contour Integrals for Nonlinear Fracture Mechanics: Formulation and Implementation Aspects. Urbana-Champaign Duffy J, Suresh S, Cho K, Bopp E R (1987) A Method for Dynamic Fracture Initiation Testing of Ceramics. J Eng Mater Technol 110:325-331. doi: 10.1115/1.3226057

Fahem A, Addis Kidane (2019) Modification of Benthem Solution for Mode I Fracture of Cylinder with Spiral Crack Subjected to Torsion. Fract Fatigue, Fail Damage Evol Proc Soc Exp Mech Ser 6:57-63. doi: https://doi.org/10.1007/978-3-319-95879-8_10

Fahem A, Kidane A (2017) A General Approach to Evaluate the Dynamic Fracture Toughness of Materials. Dyn Behav Mater Conf Proc Soc Exp Appl Mech 1:185-194. doi: https://doi.org/10.1007/978-3-319-41132-3_26

Fahem A, Kidane A (2019) A Progression on the Determination of Dynamic Fracture Initiation Toughness Using Spiral Crack. Fract Fatigue, Fail Damage Evol Conf Proc Soc Exp Mech Ser 6:89-95. doi: https://doi.org/10.1007/978-3-319-95879-8_15

Fahem A, Kidane A (2020) Mixed Mode (Mode I/III) Dynamic Fracture Initiation Toughness of Aluminum Alloy. Fract Fatigue, Fail Damage Evol Conf Proc Soc Exp Appl Mech. doi: Accepted Fahem A, Kidane A (2018) Hybrid Computational and Experimental Approach to Identify the Dynamic Initiation Fracture Toughness at High Loading Rate. Dyn Behav Mater Conf Proc Soc Exp Mech 1:141-146. doi: https://doi.org/10.1007/978-3-319-62956-8_24

Fahem A, Kidane A, Sutton M (2019a) Mode-I Dynamic Fracture Initiation Toughness Using Torsion Load. Eng Fract Mech 213:53-71. doi: https://doi.org/10.1016/j.engfracmech.2019.03.039

Fahem, A. F. (2019b). Using a Nondispersive Wave Propagation for Measuring Dynamic Fracture Initiation Toughness of Materials: Experimental and Numerical Based Study. (Doctoral dissertation). Retrieved from https://scholarcommons.sc.edu/etd/5581

Fahem A, Kidane A, Sutton M (2019c) Geometry Factors for Mode I Stress Intensity Factor of a Cylindrical Specimen with Spiral Crack Subjected to Torsion. Eng Fract Mech. doi: https://doi.org/10.1016/j.engfracmech.2019.04.007

Freund L B (1990) Dynamic Fracture Mechanics. Cambridge University Press, Cambridge Gosz M, Moran B (2002) An Interaction Energy Integral Method for Computation of Mixed Mode Stress Intensity Factors Along Non-Planar Crack Fronts in Three Dimensions. Eng Fract Mech 69:299-319.

Jiang F, Vecchio K S (2009) Hopkinson Bar Loaded Fracture Experimental Technique: A Critical Review of Dynamic Fracture Toughness Tests. Appl Mech Rev 62:1-39.

Kalthoff J F, Shockey D A (1977) Instability of Cracks Under Impulse Loads. J. Appl. Phys. 48:986-993.

Kidane A, Chalivendra V B, Shukla A (2010a) Thermo-Mechanical Stress Fields and Strain Energy Associated With a Mixed Mode Propagating Crack. Acta Mech 215:57-69.

Kidane A, Chalivendra V B, Shukla A, Chona R (2010b) Mixed Mode Dynamic Crack Propagation in Graded Materials Under Thermo-Mechanical Loading. Eng Fract Mech 77:2864-2880.

Kidane A, Wang J-A J (2013) A New Method for Dynamic Fracture Toughness Determination Using Torsion Hopkinson Pressure Bar.

Klepaczko J R (1990) Dynamic Crack Initiation, Some Experimental Methods and Modelling. Crack Dyn Met Mater Springer, Vienna 310:255-453.

Kuna M (2013) Finite Elements in Fracture Mechanics Theory-Numerics-Applications. Springer Dordrecht Heidelberg New York London Liu S, Chao Y J, Zhu X (2004) Tensile-Shear Transition in Mixed Mode I/III Fracture. Int J Solids Struct 41:6147-6172.

Maigre H, Rittel D (1993) Mixed Mode Quantification for Dynamic Fracture Initiation: Application to the Compact Compression Specimen. Int J Solids Struct 30:3233-3244.

Nakamura T, Shih C F, Freund L B (1986) Analysis of a Dynamically Loaded Three-Point-Bend Ductile Fracture Specimen. Eng. Fract. Mech. 25:323-339.

Nakamura T, Shih C F, Freund L B (1985) Elastic-Plastic Analysis of a Dynamically Loaded Circumferntially Notched Round Bar. Eng Fract 22:437*452.

Nishioka T, Atluri S N (1983) Path-Independent Integrals, Energy Release Rates, and General Solutions of Near-Tip Fields in Mixed Mode Dynamic Fracture Mechanics. Eng Fract Mech 18:1-22.

Owen D, Zhuang S, Rosakis A, Ravichandran G (1998) Experimental Determination of Dynamic Crack Initiation and Propagation Fracture Toughness in Thin Aluminum Sheets. Int J Fract 90:153-174.

Petrov Y V., Morozov N F (1994) On the Modeling of Fracture of Brittle Solids. J Appl Mech 61:710. doi: 10.1115/1.2901518

Peyman S, Ghajar R, Irani S (2017) Computation of Dynamic Stress Intensity Factors for Cracks in Three-Dimensional Functionally Graded Solids. Proc Inst Mech Eng Part L J Mater Des Appl 0:1-12. doi: 10.1177/1464420717711467

Prasad K, Srinivas M, Kamat S V (2014) Influence of Mixed Mode I/III Loading on Dynamic Fracture Toughness of Mild Steel at Room and Low Temperatures. Mater Sci Eng A 590:54-59. doi: 10.1016/j.msea.2013.09.099

Ravi-Chandar K (2004) Dynamic Fracture, First edit. Elsevier Ltd, Netherlands

Ravi-Chandar K (1995) On the Failure Mode Transitions in Polycarbonate Under Dynamic Mixed Mode Loading. Int J Solids Struct 32:925-938.

Rice J R (1968) A Path Independent Integral and the Approximate Analysis of Strain Concentration by Notches and Cracks. J Appl Mech 35:379-386.

Shih C F, Asaro R J (1988) Elastic-Plastic Analysis of Cracks on Bimaterial Interfaces: Part I—Small Scale Yielding. J Appl Mech 55:299-316. doi: 10.1115/1.3173676

Sih G C (1974) Strain-Energy-Density Factor Applied to Mixed Mode Crack Problems. Int J Fract 10:305-320.

Sih G C (1968) Some Elastodynamic Problems of Cracks. Int J Fract Mech 4:51-68. doi: 10.1007/BF00189147

Sih G C, Loeber J F (1969) Wave Propagation in an Elastic Solid With a Line of Discontinuity of Finite Crack.

Simulia, D S (2017) ABAQUS FEA. Dassault Systemes Simulia Corp., USA

Sundaram B M, Tippur H V. (2017) Dynamic Mixed Mode fracture behaviors of PMMA and polycarbonate. Eng Fract Mech 176:186-212.

Sutton M A (2007) Three-Dimensional Digital Image Correlation to Quantify Deformation and Crack-Opening Displacement in Ductile Aluminum Under Mixed Mode I/III Loading. Opt Eng 46:051003.

Sutton M A, Orteu J J, Schreier H W (2009) Image Correlation for Shape, Motion and Deformation Measurements—Basic Concepts, Theory and Applications. Image Rochester N.Y. 341.

Sutton M A, Yan J H, Tiwari V, et al (2008) The Effect of Out-of-plane Motion on 2D and 3D Digital Image Correlation Measurements. Opt Lasers Eng 46:746-757.

Vargas P, Robert, H. Dodds J (1993) Three-Dimensional, Inelastic Response of Single-Edge Notch Bend Specimens Subjected to Impact Loading. Univ Illinois Urbana-Champaign 209.

Walters M C, Paulino G H, Dodds R H (2006) Computation of Mixed Mode Stress Intensity Factors for Cracks in Three-Dimensional Functionally Graded Solids. J Eng Mech 132:1-15.

Williams M (1957a) On The Stress Distribution at The Base of a Stationary Crack. J Appl Mech 24:109-114.

Williams M L (1957b) On the Stress Distribution at the Base of A Stationary Crack. Appl Mech 24:109-114.

Yau J F, Wang S S, Corten H T (1980) A Mixed Mode Crack Analysis of Isotropic Solids Using Conservation Laws of Elasticity. J Appl Mech 47:335-341.

Yu H, Wu L, Guo L, et al. (2010) An Interaction Integral Method for 3D Curved cracks in Nonhomogeneous Materials With Complex Interfaces. Int J Solids Struct 47:2178-2189.

What is claimed is:

1. A method for determining Mixed Mode dynamic fracture toughness of engineering materials to be rated, comprising:
    providing a least two specimens of the engineering materials to be rated;
    forming a surface crack in each of the at least two specimens at a respective selected angle representative of different fracture Modes;
    respectively subjecting the at least two specimens to dynamic torsion load;
    respectively measuring torque applied to each of the at least two specimens at onset of fracture therein;
    respectively measuring full-field deformation and crack mouth opening displacement of each such fracture as a function of loading time;
    respectively estimating time at which each crack initiation is started; and
    respectively determining dynamic stress intensity factors for the specimens, based on measurements and determinations.

2. A method as in claim 1, wherein forming each surface crack in each of the at least two specimens at a selected angle, comprises forming a surface V-notch spiral crack in each respective specimen at a selected angle.

3. A method as in claim 2, further comprising performing a stereo digital image correlation for respectively measuring the full-field deformation and the crack mouth opening displacement for each of the at least two specimens as a function of loading time, and using such determinations for estimating the respective time at which each crack initiation is started.

4. A method as in claim 3, wherein determining dynamic stress intensity factors for the specimens, comprises extracting said dynamic stress intensity factors numerically based on a dynamic interaction integral method.

5. A method as in claim 4, further comprising conducting such method for a plurality of at least three specimens having respective surface V-notch spiral cracks in each of the at least three specimens at a corresponding plurality of respective selected inclined angles.

6. A method as in claim 5, wherein said plurality of at least three specimens each comprise cylindrical aluminum alloy specimens with respective V-notch spiral surface cracks at at least one of spiral angles of 0°, 11.25°, 22.5°, 33.75°, and 45°, respectively.

7. A method as in claim 5, wherein the at least three specimens are respectively subjected to dynamic torsion load using the Torsional Hopkinson Bar apparatus.

8. A method as in claim 7, wherein:
    the torsional Hopkinson bar apparatus includes incident and transmitter bars; and
    measuring torque comprises respectively, measuring torque applied on each respective of the at least three specimens at said onset of fracture by measurements from strain gauges attached to the respective incident and transmitter bars of the torsional Hopkinson bar apparatus.

9. A method as in claim 5, wherein said plurality of at least three specimens each comprise specimens with respective V-notch spiral surface cracks at spiral angles selected to include at least a pure Mode-III fracture, a pure Mode-I fracture, and at least one Mixed Mode fracture combining Modes I and III.

10. A method as in claim 9, wherein said plurality of at least three specimens each comprise specimens with respective V-notch spiral surface cracks at spiral angles selected to include one pure Mode-III fracture at a fracture angle of 0°, a pure Mode-I fracture at a fracture angle of 45°, and a plurality of Mixed Mode fractures having fracture angles of 11.25°, 22.50°, 33.75° combining Modes I and III.

11. A method as in claim 9, wherein said plurality of at least three specimens each comprise specimens with respective V-notch spiral surface cracks at spiral angles selected to include one pure Mode-III fracture at a fracture angle of 0°, a pure Mode-I fracture at a fracture angle of 45°, and a plurality of Mixed Mode fractures having fracture angles of from 5° to 28° for combining Modes I and III.

12. A method as in claim 9, further including determining for said at least three specimens the Mode-I ($K_{Id}$), Mode-III ($K_{IIId}$), and Mixed Mode ($K_{(I/III)d}$) dynamic initiation toughness ratings.

13. A method as in claim 12, further including determining such Mixed Mode fracture values as a function of spiral angles.

14. A method as in claim 13, further including determining such Mixed Mode fracture values as a function of loading rate.

15. Methodology for determining dynamic Mixed Mode (I/III) of ductile materials by investigating a plurality of spiral crack specimens from pure Mode-III up to pure Mode-I throughout the dynamic Mixed Mode (I/III) of fracture under pure impulse torsional load, comprising:
    using a torsional Hopkinson Bar to generate a torsional impulse load for each specimen;
    using one-dimension wave propagation theory to measure a far-field maximum fracture load for each specimen;
    determining under pure torsional load dynamic stress intensity factors of plural specimen spiral cracks with different crack angles; and
    using dynamic interaction integral numerical calculation to determine dynamic fracture initiation properties $K_{Id}$, $K_{IIId}$, and $K_{Md}$ of Mode-I, Mode-III, and Mixed Mode (I/III), respectively.

16. Methodology as in claim 15, further comprising using a three-dimensional Digital Image Correlation (DIC) method to measure Crack Mouth Opening Displacement (CMOD) for each specimen and to monitor fracture initiation time.

17. Methodology as in claim 16, further comprising determining dynamic stress intensity factor of said materials as a function of specimen crack angles and as a function of fracture initiation time.

18. Methodology as in claim 16, further comprising determining dynamic stress intensity factor of said materials as a function of specimen crack angles and as a function of loading rates.

19. Methodology as in claim 16, wherein said specimens comprised Aluminum and said method further comprises determining the average Mode-I, Mode-III, and Mixed Mode (I/III) of dynamic fracture initiation toughness of Aluminum as a function of loading rate.

20. Methodology to estimate dynamic fracture properties for Mode-I, Mode-III, and Mixed Mode I/III fracture conditions for engineering materials subjected to critical load with a different loading rate without inertia effect, comprising:

applying loading to a plurality of specimens of engineering materials sufficient to induce fracture therein in plural Modes of fracture conditions;

measuring initiation time $t_f$ of a fracture event;

measuring incident torque during a fracture event;

inputting measured incident torque to a finite element model;

calculating the interaction integral of a unit virtual advance of a finite crack front segment for a specific mode at a particular point as a function of time; and using the components of dynamic interaction integral to calculate the dynamic stress intensity factor for each mode.

21. Methodology as in claim 20, further including measuring the fracture time by two experimental methods, including strain gage signal and stereo Digital Image Correlation (3D-DIC).

22. Methodology as in claim 21, wherein for strain gages signals, said initiation time $t_f$ of a fracture event is identified at the location where sudden change in transmitted and reflected signals occurred.

23. Methodology as in claim 22, wherein said stereo Digital Image Correlation is used to measure a Crack Mouth Opening Displacement (CMOD), by measuring, with displacement of the crack edge, at two points (upper ($ECD_0$) and lower edge ($ECD_1$)) across the crack line to calculate the CMOD.

24. Methodology as in claim 21, further including using such methodology for determining dynamic initiation fracture toughness Mixed Mode fracture (Mode-I and Mode-III) for engineering materials structures that are subjected to axial/torsion loading.

25. Methodology as in claim 24, wherein said engineering materials structures comprise one of pipes, aircraft wings, shafts, and rotor blades.

26. Methodology as in claim 21, wherein applying loading to such plurality of specimens comprising using torsional Hopkinson bar apparatus for applying to load, and wherein measuring said initiation time $t_f$ of a fracture event includes measuring through strain gages attached to an incident bar and a transmitter bar of the torsional Hopkinson bar apparatus.

27. Methodology as in claim 26, wherein during loading, further including using a hydraulic-driven rotary actuator to apply and store shear strain in a portion of said incident bar between a rotary actuator and a clamp system, and then suddenly releasing the stored shear strain, to cause half of said stored shear strain to propagate towards a specimen through the incident bar.

28. Methodology as in claim 27, wherein when an incident wave reaches a specimen, with some of said incident wave transmitted to an output bar through the specimen, and the remainder of said incident wave reflected back to said incident bar, acquiring the incident, transmitted, and reflected shear strain data by using pairs of two-element 90-degree shear strain gauges attached to the bars at respective positions thereof.

29. Methodology as in claim 20, further including using such methodology for determining dynamic initiation fracture toughness Mixed Mode fracture (Mode-I and Mode-III) as seen in thin-walled structures.

30. Methodology as in claim 20, wherein the plurality of specimens, respectively, comprise cylindrical aluminum alloy specimens, each having a V-notch spiral crack at spiral angles of 0°, 11.25°, 22.5°, 33.75°, and 45° respectively.

31. Methodology as in claim 30, further including using a shell revolve to make a spiral seam crack along the specimen length for all specimens.

32. Methodology as in claim 20, wherein the plurality of specimens, respectively, comprise specimens each having a V-notch spiral crack at spiral angles of 0°, 45°, and an angle therebetween, respectively.

33. Methodology as in claim 32, further including determining Dynamic Stress Intensity Factors for respective spiral crack angle examples of pure Mode-III (at a spiral angle of 0°), pure Mode-I (at a spiral angle of 45°), and Mixed Mode I/III (an angle therebetween).

34. Methodology as in claim 33, further including determining loading rate effects versus respective spiral crack angular specimens, where the loading rate $$\dot{K} = \frac{K}{t_f}(\text{Pa}\sqrt{m}/s),$$

provides the measure of loading applied per time around a crack tip, with the unit of stress intensity factor K, and where $t_f$ is said initiation time of a fracture event.

35. Methodology as in claim 34, wherein the plurality of specimens, respectively, comprise specimens each having a V-notch spiral crack at spiral angles of 0°, 11.25°, 22.5°, 33.75°, and 45°, respectively.

* * * * *